US012656800B2

(12) United States Patent
Yasusaka

(10) Patent No.: US 12,656,800 B2
(45) Date of Patent: Jun. 16, 2026

(54) LINEAR POWER SUPPLY, ELECTRONIC DEVICE, AND VEHICLE

(71) Applicant: ROHM CO., LTD., Kyoto (JP)

(72) Inventor: Makoto Yasusaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 134 days.

(21) Appl. No.: 18/501,474

(22) Filed: Nov. 3, 2023

(65) Prior Publication Data

US 2024/0061457 A1 Feb. 22, 2024

Related U.S. Application Data

(63) Continuation of application No. PCT/JP2022/020358, filed on May 16, 2022.

(30) Foreign Application Priority Data

May 21, 2021 (JP) ................................ 2021-085898
May 21, 2021 (JP) ................................ 2021-085900

(51) Int. Cl.
*G05F 1/575* (2006.01)

(52) U.S. Cl.
CPC .................................... *G05F 1/575* (2013.01)

(58) Field of Classification Search
CPC . G05F 1/575; G05F 1/56; G05F 1/562; G05F 1/563; G05F 1/565; G05F 1/569; G05F 1/571; G05F 1/573; G05F 1/5735; G05F 1/595
See application file for complete search history.

(56) References Cited

U.S. PATENT DOCUMENTS 6,989,660 B2 * 1/2006 Mauthe .................. G05F 1/465 323/275
2006/0119335 A1 * 6/2006 Eberlein ................. G05F 1/575 323/282

FOREIGN PATENT DOCUMENTS

JP 2001-306163 11/2001
JP 2012-027811 2/2012
JP 2019-133266 8/2019
JP 2020-173702 10/2020
JP 2021-033472 3/2021

OTHER PUBLICATIONS

International Search Report in International Appln. No. PCT/JP2022/020358, mailed on Jul. 19, 2022, 4 pages.
JP OA—Japanese Patent Office, Office Action in Japanese Appln. No. 2023-522652, dated Apr. 21, 2026, 10 pages (with English Translation).

* cited by examiner

*Primary Examiner* — Nguyen Tran
(74) *Attorney, Agent, or Firm* — Fish & Richardson P.C.

(57) ABSTRACT

A linear power supply includes: a first transistor configured to be connectable between an input terminal configured to input an input voltage thereto and an output terminal configured to output an output voltage therefrom; a reference voltage generator configured to generate a reference voltage; a controller configured to control the first transistor based on the difference between a feedback voltage reflecting the output voltage and the reference voltage; and a second transistor configured to be connectable between the input terminal or the output terminal and the first transistor and configured to clamp the first terminal-to-second terminal voltage of the first transistor.

20 Claims, 31 Drawing Sheets

LINEAR POWER SUPPLY, ELECTRONIC DEVICE, AND VEHICLE

CROSS-REFERENCE TO RELATED APPLICATIONS

This nonprovisional application is a continuation application of International Patent Application No. PCT/JP2022/020358 filed on May 16, 2022, which claims priority Japanese Patent Application No. 2021-085898 filed in Japan on May 21, 2021 and Japanese Patent Application No. 2021-085900 filed in Japan on May 21, 2021, the entire contents of which are hereby incorporated by reference.

BACKGROUND OF THE INVENTION

1. Technical Field

The invention disclosed herein relates to linear power supplies, electronic devices, and vehicles.

2. Description of Related Art

Linear power supplies (series regulators such as LDO [low-dropout] regulators) are used as power supply means in various devices (see, for example, JP-A-2021-33472).

DETAILED DESCRIPTION

In the present description, "MOS (metal-oxide-semiconductor) transistor" denotes a transistor of which the gate has a structure composed of at least three layers which are: a layer of a conductor or a semiconductor with a low resistance value such as polysilicon; a layer of an insulator; and a layer of a P-type, N-type, or intrinsic semiconductor. That is, a MOS transistor may have any gate structure other than a three-layer structure of metal, oxide, and semiconductor.

In the present description, "constant value" denotes a value that is constant under ideal conditions and may in practice be a value that can vary slightly with change in temperature and the like. In the present description, "equal values" denotes values that are equal under ideal conditions and may be values that slightly differ due to manufacturing variation, change in temperature, and the like.

In the present description, "constant voltage" denotes a voltage that is constant under ideal conditions and may in practice be a voltage that can vary slightly with change in temperature and the like.

In the present description, "reference voltage" denotes a voltage that is constant under ideal conditions for use as a reference and may in practice be a voltage that can vary slightly with change in temperature and the like.

In the present description, "constant current" denotes a current that is constant under ideal conditions and may in practice be a current that can vary slightly with change in temperature and the like.

Linear Power Supply of a First Reference Example

Figure 1:
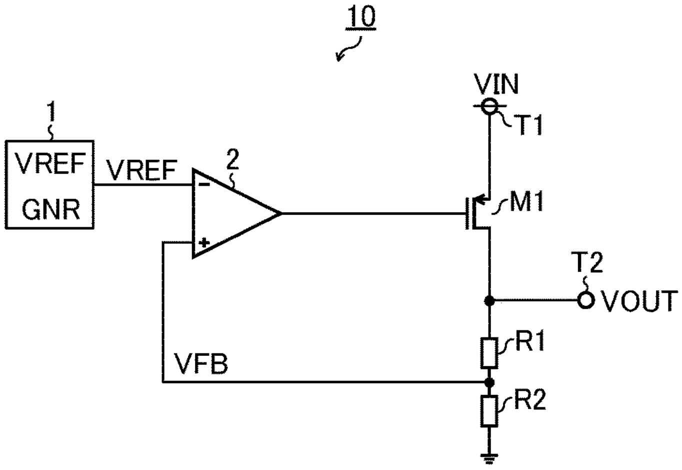
FIG. 1 is a diagram showing an outline of the configuration of a linear power supply of a first reference example.

FIG. 1 is a diagram showing an outline of the configuration of a linear power supply of a first reference example. The linear power supply 10 of the first reference example includes a reference voltage generator 1, an amplifier 2, a first transistor M1 as output transistor, and resistors R1 and R2. The linear power supply 10 of the first reference example bucks (steps down) an input voltage VIN fed in via an input terminal T1 to generate an output voltage VOUT. The output voltage VOUT is fed out via an output terminal T2.

The first transistor M1 is connected between the input terminal T1 and the output terminal T2. The first transistor M1 is controlled according to the output signal of the amplifier 2. More specifically, the conductance of the first transistor M1 (put inversely, its on-resistance value) is controlled according to the output signal of the amplifier 2. In the linear power supply 10 of the first reference example, the first transistor M1 is implemented with a PMOSFET (P-channel MOSFET). Accordingly, as the gate voltage of the first transistor M1 becomes lower, the conductance of the first transistor M1 increases and the output voltage VOUT rises. Reversely, as the gate voltage of the first transistor M1 becomes higher, the conductance of the first transistor M1 decreases and the output voltage VOUT falls. The first transistor M1 may be implemented with, instead of a PMOSFET, a PNP bipolar transistor.

The resistors R1 and R2 convert the output voltage VOUT into a feedback voltage VFB. The resistor R1 has a resistance value of r1 and the resistor R2 has a resistance value of r2. The feedback voltage VFB is given by the following expression:

$$VFB = V\mathrm{OUT} \times [r2/(r1+r2)]$$

In applications where the output voltage VOUT falls within the input dynamic range of the amplifier 2, the resistors R1 and R2 can be omitted and, as the feedback voltage VFB, the output voltage VOUT as it is can be fed directly to the amplifier 2.

The reference voltage generator 1 generates and output a reference voltage VREF. The reference voltage generator 1 can be implemented suitably with, for example, a band-gap voltage source with low dependence on source voltage or temperature.

A controller including the amplifier 2 controls the first transistor M1 based on the difference between the feedback voltage VFB, which is fed to the non-inverting input terminal (+) of the amplifier 2, and the reference voltage VREF, which is fed to the inverting input terminal (−) of the amplifier 2. More specifically, the controller including the amplifier 2 controls the first transistor M1 such that the feedback voltage VFB is equal to the reference voltage VREF. The controller including the amplifier 2 increases the gate voltage of the first transistor M1 as the difference ΔV (=VFB−VREF) between the feedback voltage VFB and the reference voltage VREF becomes higher, and decreases the gate voltage of the first transistor M1 as the difference ΔV becomes lower.

Depending on the specific circuit configuration of the controller including the amplifier 2, the non-inverting input terminal (+) can be fed with the reference voltage VREF and the inverting input terminal (−) with the feedback voltage VFB.

Figure 2:
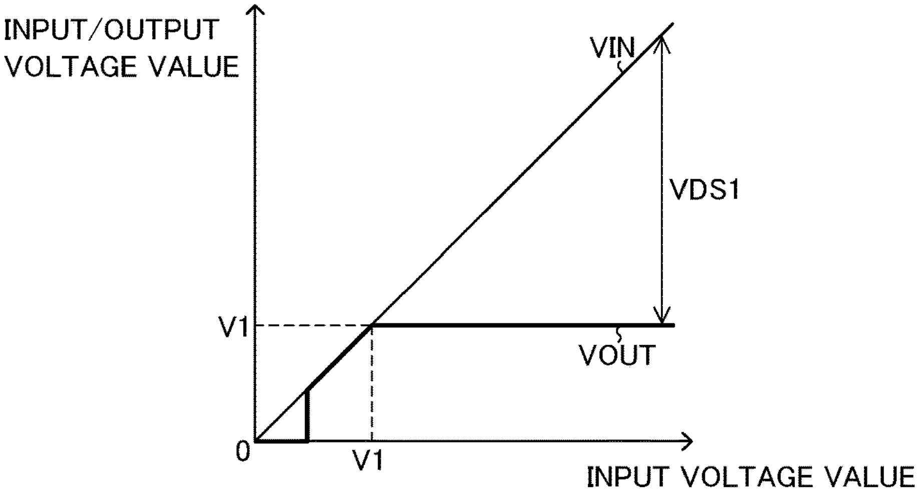
FIG. 2 is a graph showing the relationship between the input voltage to and the output voltage from the linear power supply of the first reference example.

FIG. 2 is a graph showing the relationship between the input voltage VIN to and the output voltage VOUT from the linear power supply 10 of the first reference example. In the graph of FIG. 2, the horizontal axis represents the value of the input voltage VIN. In the graph of FIG. 2, the vertical axis represents the value of the input voltage VIN or the output voltage VOUT. In the linear power supply 10 of the first reference example, the resistance value of the resistor R1, the resistance value of the resistor R2, and the reference voltage VREF are set such that the target value of the output voltage VOUT equals a voltage V1.

In the range where the input voltage VIN is higher than the voltage V1, a large variation in the input voltage VIN causes a large variation in the drain-source voltage VDS1 of the first transistor M1. This is because, in the range where the input voltage VIN is higher than the voltage V1, the drain-source voltage VDS1 of the first transistor M1 has the value equal to the input voltage VIN minus the output voltage VOUT.

Figure 3:
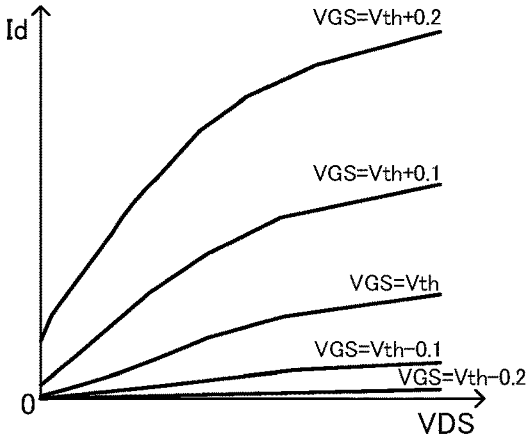
FIG. 3 is a graph showing the characteristics of a MOSFET.

FIG. 3 is a graph showing the characteristics of a MOSFET. In the graph of FIG. 3, the horizontal axis represents the drain-source voltage VDS of the MOSFET. In the graph of FIG. 3, the vertical axis represents the drain current Id of the MOSFET.

FIG. 3 shows the relationship between the drain-source voltage VDS and the drain current Id with the gate-source voltage VGS higher than a threshold voltage Vth by 0.2 V. FIG. 3 also shows the relationship between the drain-source voltage VDS and the drain current Id with the gate-source voltage VGS higher than a threshold voltage Vth by 0.1 V. FIG. 3 also shows the relationship between the drain-source voltage VDS and the drain current Id with the gate-source voltage VGS equal to the threshold voltage Vth. FIG. 3 also shows the relationship between the drain-source voltage VDS and the drain current Id with the gate-source voltage VGS lower than a threshold voltage Vth by 0.1 V. FIG. 3 also shows the relationship between the drain-source voltage VDS and the drain current Id with the gate-source voltage VGS lower than a threshold voltage Vth by 0.2 V.

If, with respect to a MOSFET, the gate-source voltage VGS is close to the threshold voltage Vth, a large variation in the drain-source voltage VDS causes a large variation in the drain current Id. That is, if the gate-source voltage VGS is close to the threshold voltage Vth, a large variation in the drain-source voltage VDS causes a large variation in the characteristics of the MOSFET.

Accordingly, if the first transistor M1 is implemented with a transistor like the one just described with which, when it operates around the border of the cut-off region, a large change in its first terminal-to-second terminal voltage causes a large change in its characteristics and if the first transistor M1 is controlled in such a way that the controller including the amplifier 2 operates around the cut-off region, the linear power supply 10 of the first reference example has the following drawback.

With the linear power supply 10 of the first reference example, a large variation in the input voltage VIN causes a large variation in the first terminal-to-second terminal voltage of the first transistor M1 and hence a variation in the characteristics of the power supply, and this makes it difficult to sustain the stability of the power supply.

As a solution to the drawback mentioned above, a first embodiment will now be presented.

Linear Power Supply of a First Embodiment

Figure 4:
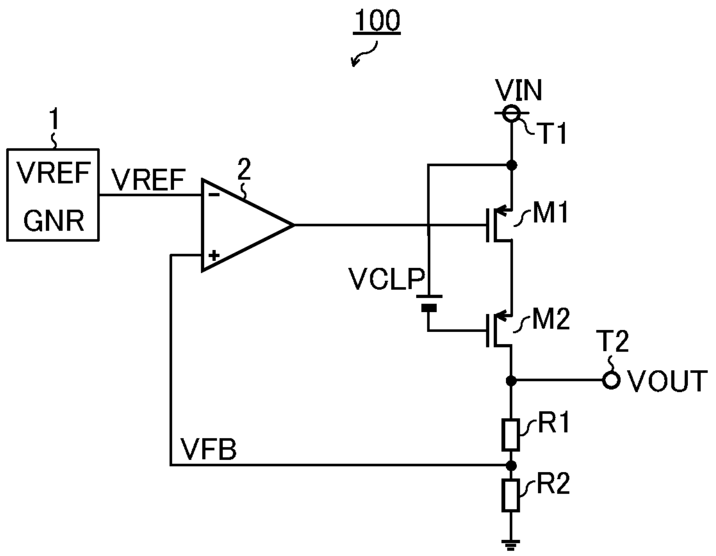
FIG. 4 is a diagram showing an outline of the configuration of a linear power supply of a first embodiment.

FIG. 4 is a diagram showing an outline of the configuration of a linear power supply according to a first embodiment. The linear power supply 100 of the first embodiment is based on the linear power supply 10 (FIG. 1) of the first reference example described previously, and includes, in addition to the components mentioned previously, a second transistor M2.

In the linear power supply 100 of the first embodiment, the second transistor M2 is implemented with a PMOSFET. The second transistor M2 may be implemented with, instead of a PMOSFET, a PNP bipolar transistor.

In the linear power supply 100 of the first embodiment, the second transistor M2 is connected between the first transistor M1 and the output terminal T2. The second transistor M2 is configured to clamp the drain-source voltage VDS1 of the first transistor M1. In a case where the first transistor M1 is implemented with, instead of a PMOSFET, a PNP bipolar transistor, the second transistor M2 is configured to clamp the collector-emitter voltage of the first transistor M1.

A control voltage (VIN−VCLP) lower than the input voltage VIN by a predetermined value is fed to the gate of the second transistor M2. Thus, the drain-source voltage VDS1 of the first transistor M1 is a voltage equal to the sum of the voltage VCLP with the predetermined value and the threshold voltage Vth2 of the second transistor M2. That is, the second transistor M2 clamps the drain-source voltage VDS1 of the first transistor M1 substantially at a fixed value.

Figure 5:
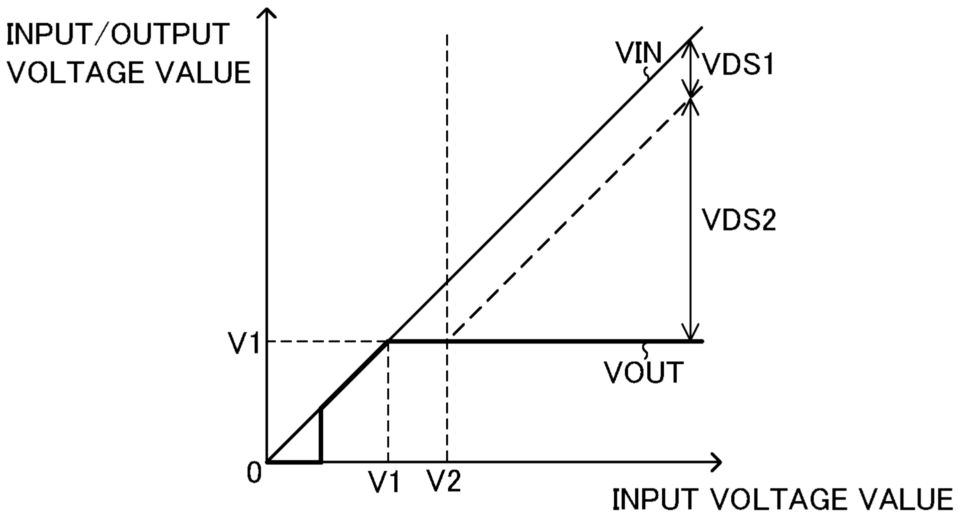
FIG. 5 is a graph showing the relationship between the input voltage to and the output voltage from the linear power supply of the first embodiment.

FIG. 5 is a graph showing the relationship between the input voltage VIN to and the output voltage VOUT from the linear power supply 100 of the first embodiment. In the graph of FIG. 5, the horizontal axis represents the value of the input voltage VIN. In the graph of FIG. 5, the vertical axis represents the value of the input voltage VIN or the output voltage VOUT. In the linear power supply 100 of the first embodiment, the resistance value of the resistor R1, the resistance value of the resistor R2, and the reference voltage VREF are set such that the target value of the output voltage VOUT equals a voltage V1.

In the range where the input voltage VIN is higher than a voltage V2 (=V1+VDS1), the second transistor M2 clamps the drain-source voltage VDS1 of the first transistor M1 substantially at a fixed value. Thus, even in the event of a large variation in the input voltage VIN, in the range where the input voltage VIN is higher than the voltage V2 (=V1+VDS1), the drain-source voltage VDS1 of the first transistor remains substantially at the fixed value. It is thus possible suppress, in the event of a large variation in the input voltage VIN, a variation in the characteristics of the power supply, and this makes it easy to sustain the stability of the power supply.

Seeing that, in the range where the input voltage VIN is higher than the voltage V2 (=V1+VDS1), the drain-source voltage VDS1 of the first transistor remains substantially at a fixed value, it is preferable that the first transistor M1 be implemented with a transistor with a withstand voltage lower than that of the second transistor M2. This helps reduce the size and cost of the first transistor M1.

Figure 6:
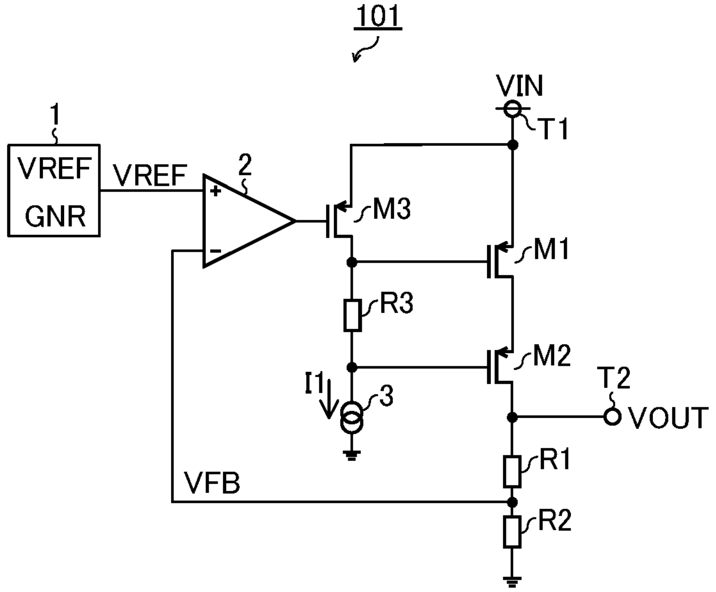
FIG. 6 is a diagram showing a first configuration example of the linear power supply of the first embodiment.

First Configuration Example of the Linear Power Supply of the First Embodiment FIG. 6 is a diagram showing a first configuration example of the linear power supply according to the first embodiment. In the linear power supply 101 of the first embodiment shown in FIG. 6, a controller that controls the first transistor M1 includes an amplifier 2, a third transistor M3, a resistor R3, and a current source 3.

In the linear power supply 101 of the first embodiment, the third transistor M3 is implemented with a PMOSFET. The non-inverting input terminal (+) of the amplifier 2 is fed with the reference voltage VREF, and the inverting input terminal (−) of the amplifier 2 is fed with the feedback voltage VFB. The output signal of the amplifier 2 is fed to the gate of the third transistor M3.

The source of the third transistor M3 is connected to the input terminal T1. The drain of the third transistor M3 is connected to the gate of the first transistor M1 and to the first terminal of the resistor R3. The second terminal of the resistor R3 is connected to the gate of the second transistor M2 and to the first terminal of the current source 3. The second terminal of the current source 3 is connected to a ground potential.

The current source 3 outputs a constant current I1. As the difference ΔV' (=VREF−VFB) between the feedback voltage VFB and the reference voltage VREF becomes higher, the amplifier 2 increases the gate voltage of the third transistor M3 and decreases the gate voltage of the first transistor M1; as the difference ΔV' becomes lower, the amplifier 2 decreases the gate voltage of the third transistor M3 and increases the gate voltage of the first transistor M1.

The amplifier 2 controls the gate-source voltage of the third transistor M3 such that the gate-source voltage of the first transistor M1 equals the threshold voltage of the first transistor M1. As a result, the drain-source voltage of the third transistor M3 remains close to the threshold voltage of the first transistor M1.

Instead of the resistor R3, a MOSFET, bipolar transistor, diode, or the like may be used in such a way that the voltage drop across the element used instead of the resistor R3 remains constant. The third transistor M3 may be implemented with, instead of a PMOSFET, an PNP bipolar transistor.

Figure 7:
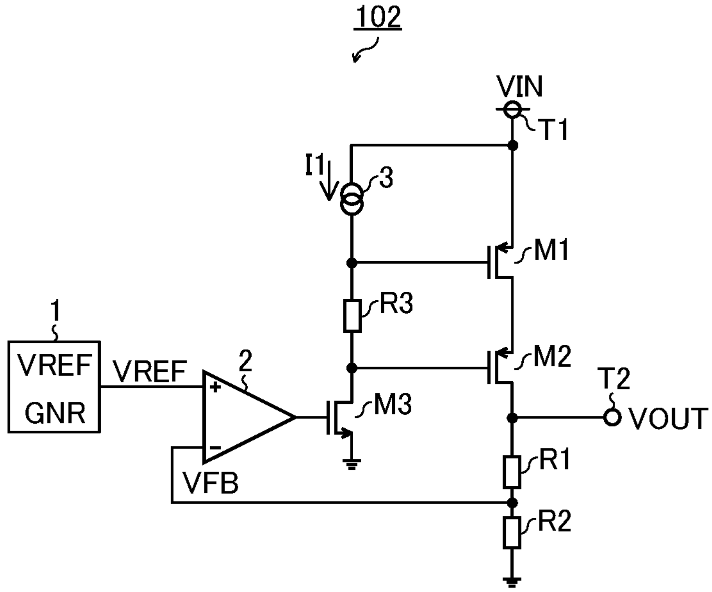
FIG. 7 is a diagram showing a second configuration example of the linear power supply of the first embodiment.

Second Configuration Example of the Linear Power Supply of the First Embodiment FIG. 7 is a diagram showing a second configuration example of the linear power supply according to the first embodiment. In the linear power supply 102 of the first embodiment shown in FIG. 7, a controller that controls the first transistor M1 includes an amplifier 2, a third transistor M3, a resistor R3, and a current source 3.

In the linear power supply 102 of the first embodiment, the third transistor M3 is implemented with an NMOSFET (N-channel MOSFET). The non-inverting input terminal (+) of the amplifier 2 is fed with the reference voltage VREF, and the inverting input terminal (−) of the amplifier 2 is fed with the feedback voltage VFB. The output signal of the amplifier 2 is fed to the gate of the third transistor M3.

The first terminal of the current source 3 is connected to the input terminal T1. The second terminal of the current source 3 is connected to the gate of the first transistor M1 and to the first terminal of the resistor R3. The second terminal of the resistor R3 is connected to the gate of the second transistor M2 and to the drain of the third transistor M3. The source of the third transistor M3 is connected to the ground potential.

The current source 3 outputs a constant current I1. As the difference ΔV' (=VREF−VFB) between the feedback voltage VFB and the reference voltage VREF becomes higher, the amplifier 2 increases the gate voltage of the third transistor M3 and decreases the gate voltage of the first transistor M1; as the difference ΔV' becomes lower, the amplifier 2 decreases the gate voltage of the first transistor M3 and increases the gate voltage of the first transistor M1.

The gate voltage of the second transistor M2 has a value equal to the input voltage VIN minus the voltage drops across the current source 3 and across the resistor R3. The second transistor M2 clamps the drain-source voltage of the first transistor M1.

Instead of the resistor R3, a MOSFET, bipolar transistor, diode, or the like may be used in such a way that the voltage drop across the element used instead of the resistor R3 remains constant. The third transistor M3 may be implemented with, instead of an NMOSFET, an NPN bipolar transistor.

Figure 8:
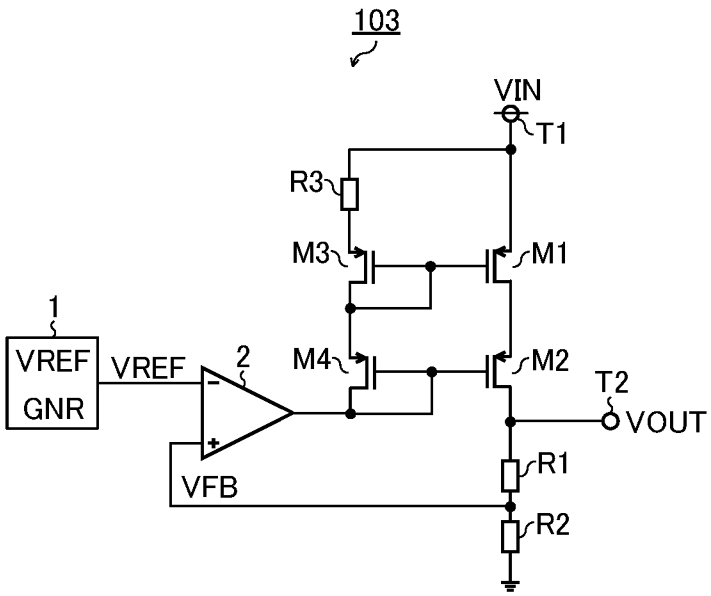
FIG. 8 is a diagram showing a third configuration example of the linear power supply of the first embodiment.

Third Configuration Example of the Linear Power Supply of the First Embodiment FIG. 8 is a diagram showing a third configuration example of the linear power supply according to the first embodiment. In the linear power supply 103 of the first embodiment shown in FIG. 8, a controller that controls the first transistor M1 includes an amplifier 2, a third transistor M3, a fourth transistor M4, and a resistor R3.

In the linear power supply 103 of the first embodiment, the third transistor M3 is implemented with a PMOSFET, and the fourth transistor M4 is implemented with a PMOSFET. The non-inverting input terminal (+) of the amplifier 2 is fed with the feedback voltage VFB, and the inverting input terminal (−) of the amplifier 2 is fed with the reference voltage VREF. The output signal of the amplifier 2 is connected to the drain and the gate of the fourth transistor M4 and to the gate of the second transistor M2.

The first terminal of the resistor R3 is connected to the input terminal T1. The second terminal of the current source 3 is connected to the source of the third transistor M3. The gate and the drain of the third transistor M3 and the source of the fourth transistor M4 are connected to the gate of the first transistor M1.

The first and third transistors M1 and M3 constitute a first current mirror circuit, and the second and fourth transistors M2 and M4 constitute a second current mirror circuit. As the difference ΔV (=VFB−VREF) between the feedback voltage VFB and the reference voltage VREF becomes lower, the amplifier 2 decreases the gate voltage of the fourth transistor M4 and decreases the gate voltage of the first transistor M1; as the difference ΔV becomes higher, the amplifier 2 increases the gate voltage of the fourth transistor M4 and increases the gate voltage of the first transistor M1.

The gate voltage of the second transistor M2 has a value equal to the input voltage VIN minus the sum of the voltage drop across the resistor R3, the threshold voltage of the third transistor M3, and the threshold voltage of the fourth transistor M4. The second transistor M2 clamps the drain-source voltage of the first transistor M1.

The resistor R3 is a resistor for gain adjustment; accordingly, where no gain adjustment is required, the resistor R3 may be omitted. The third transistor M3 may be implemented with, instead of a PMOSFET, a PNP bipolar transistor. The fourth transistor M4 may be implemented with, instead of a PMOSFET, a PNP bipolar transistor.

Figure 9:
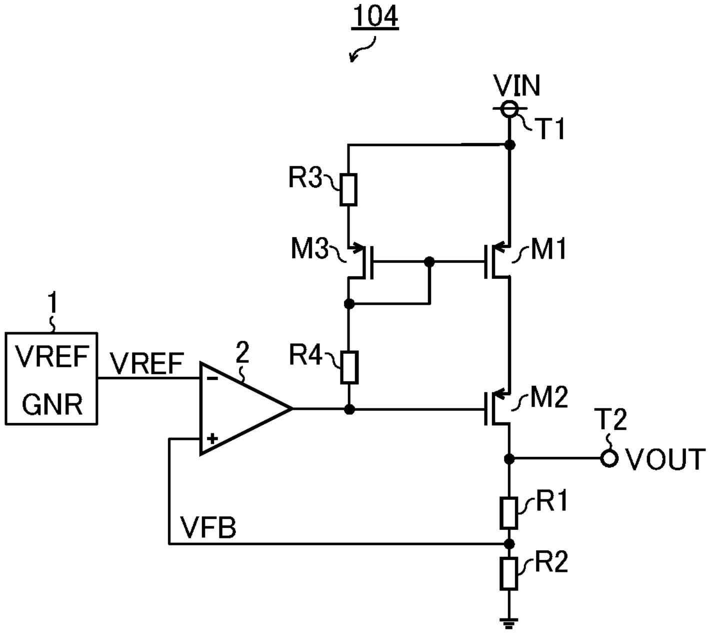
FIG. 9 is a diagram showing a fourth configuration example of the linear power supply of the first embodiment.

Fourth Configuration Example of the Linear Power Supply of the First Embodiment FIG. 9 is a diagram showing a fourth configuration example of the linear power supply according to the first embodiment. In the linear power supply 104 of the first embodiment shown in FIG. 9, a controller that controls the first transistor M1 includes an amplifier 2, a third transistor M3, and resistors R3 and R4.

In the linear power supply 104 of the first embodiment, the third transistor M3 is implemented with a PMOSFET. The non-inverting input terminal (+) of the amplifier 2 is fed with the feedback voltage VFB, and the inverting input terminal (−) of the amplifier 2 is fed with the reference voltage VREF. The output signal of the amplifier 2 is fed to the gate of the second transistor M2.

The first terminal of the resistor R3 is connected to the input terminal T1. The second terminal of the resistor R3 is connected to the source of the third transistor M3. The gate and the drain of the third transistor M3 and the first terminal of the resistor R4 are connected to the gate of the first transistor M1. The second terminal of the resistor R4 is connected to the output terminal of the amplifier 2 and to the gate of the second transistor M2.

The first and third transistors M1 and M3 constitute a current mirror circuit. As the difference ΔV (=VFB−VREF) between the feedback voltage VFB and the reference voltage VREF becomes lower, the amplifier 2 decreases the gate voltage of the first transistor M1; as the difference ΔV becomes higher, the amplifier 2 increases the gate voltage of the first transistor M1.

The gate voltage of the second transistor M2 has a value equal to the input voltage VIN minus the sum of the voltage drop across the resistor R3, the threshold voltage of the third transistor M3, and the voltage drop across the fourth resistor. The second transistor M2 clamps the drain-source voltage of the first transistor M1.

The resistor R3 is a resistor for gain adjustment; accordingly, where no gain adjustment is required, the resistor R3 may be omitted. The third transistor M3 may be implemented with, instead of a PMOSFET, a PNP bipolar transistor.

Figure 10:
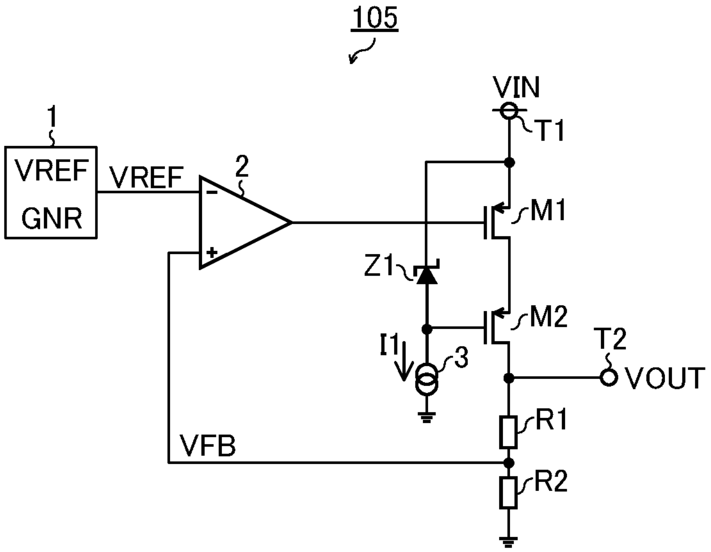
FIG. 10 is a diagram showing a fifth configuration example of the linear power supply of the first embodiment.

Fifth Configuration Example of the Linear Power Supply of the First Embodiment FIG. 10 is a diagram showing a fifth configuration example of the linear power supply according to the first embodiment. In the linear power supply 105 of the first embodiment shown in FIG. 10, a controller that controls the first transistor M1 includes an amplifier 2. In the linear power supply 105 of the first embodiment shown in FIG. 10, a control voltage feeder that feeds the control terminal of the second transistor M2 with a control voltage lower than the input voltage VIN by a predetermined value includes a Zener diode Z1 and a current source 3.

The non-inverting input terminal (+) of the amplifier 2 is fed with the feedback voltage VFB, and the inverting input terminal (−) of the amplifier 2 is fed with the reference voltage VREF. The output signal of the amplifier 2 is fed to the gate of the first transistor M1.

The cathode of the Zener diode Z1 is connected to the input terminal T1. The anode of the Zener diode Z1 is connected to the gate of the second transistor M2 and to the first terminal of the current source 3. The second terminal of the current source 3 is connected to the ground potential.

The gate voltage of the second transistor M2 has a value equal to the input voltage VIN minus the Zener voltage of the Zener diode Z1. The second transistor M2 clamps the drain-source voltage of the first transistor M1.

With the linear power supply 105 of the first embodiment shown in FIG. 10, where the control voltage feeder is not included in the controller, it is easy for the controller to control the first transistor M1.

Linear Power Supply of a Second Reference Example

Figure 11:
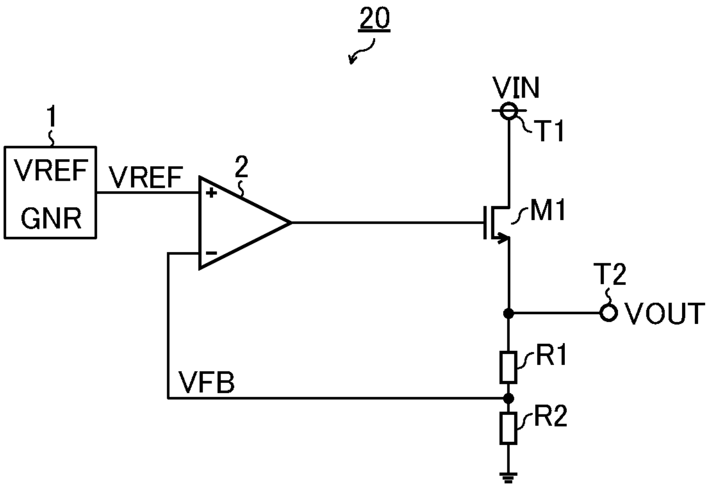
FIG. 11 is a diagram showing an outline of the configuration of a linear power supply of a second reference example.

FIG. 11 is a diagram showing an outline of the configuration of a linear power supply of a second reference example. The linear power supply 20 of the second reference example differs from the linear power supply 10 of the first reference example in that the first transistor M1 as an output transistor is an NMOSFET, and is otherwise basically similar to the linear power supply 10 of the first reference example.

In the linear power supply 20 of the second reference example, the first transistor M1 may be implemented with, instead of an NMOSFET, an NPN bipolar transistor.

Figure 12:
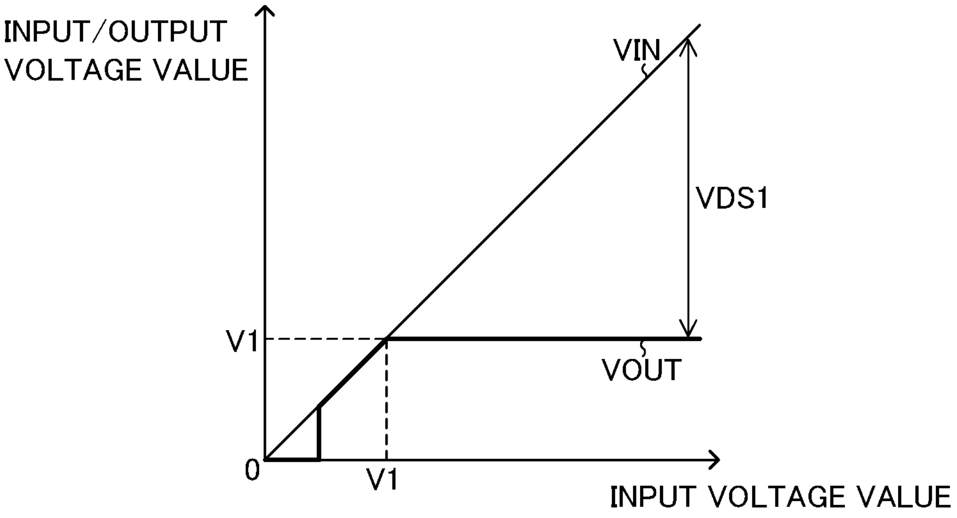
FIG. 12 is a graph showing the relationship between the input voltage to and the output voltage from the linear power supply of the second reference example.

FIG. 12 is a graph showing the relationship between the input voltage VIN to and the output voltage VOUT from the linear power supply 20 of the second reference example. In the graph of FIG. 12, the horizontal axis represents the value of the input voltage VIN. In the graph of FIG. 12, the vertical axis represents the value of the input voltage VIN or the output voltage VOUT. In the linear power supply 20 of the second reference example, the resistance value of the resistor R1, the resistance value of the resistor R2, and the reference voltage VREF are set such that the target value of the output voltage VOUT equals a voltage V1.

In the linear power supply 20 of the second reference example, as in the linear power supply 10 of the first reference example, a large variation in the input voltage VIN causes a large variation in the first terminal-to-second terminal voltage of the first transistor M1 and hence a variation in the characteristics of the power supply, and this makes it difficult to sustain the stability of the power supply.

As a solution to the drawback mentioned above, a second embodiment will now be presented.

Linear Power Supply of a Second Embodiment

Figure 13:
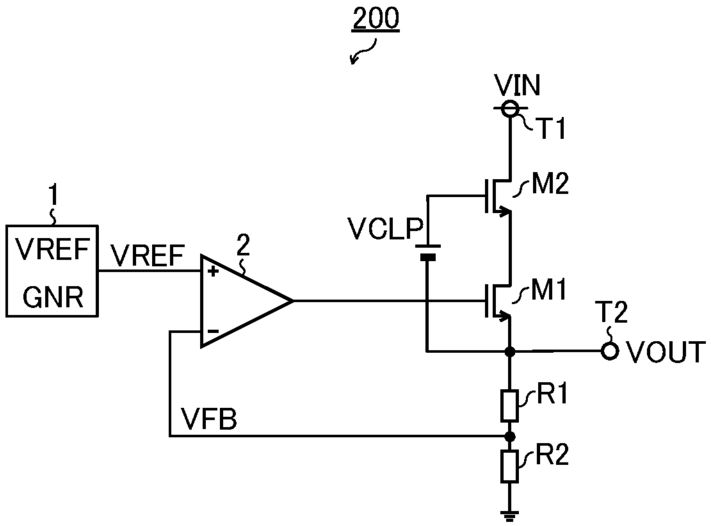
FIG. 13 is a diagram showing an outline of the configuration of a linear power supply of a second embodiment.

FIG. 13 is a diagram showing an outline of the configuration of a linear power supply according to a second embodiment. The linear power supply 200 of the second embodiment is based on the linear power supply 20 (FIG. 11) of the second reference example described previously, and includes, in addition to the components mentioned previously, a second transistor M2.

The linear power supply 200 of the second embodiment has a configuration basically similar to that of the linear power supply 100 of the first embodiment, and therefore no detailed description will be repeated.

Figure 14:
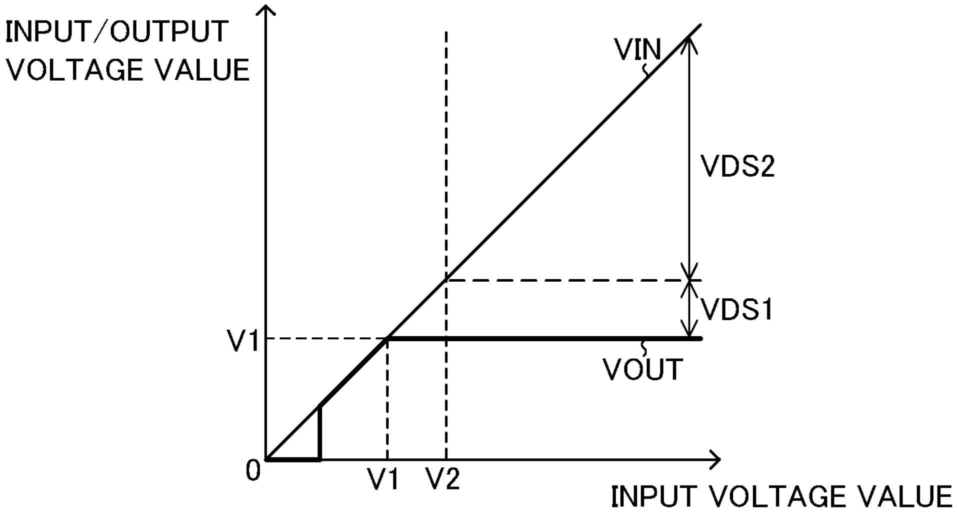
FIG. 14 is a graph showing the relationship between the input voltage to and the output voltage from the linear power supply of the second embodiment.

FIG. 14 is a graph showing the relationship between the input voltage VIN to and the output voltage VOUT from the linear power supply 200 of the second embodiment. In the graph of FIG. 14, the horizontal axis represents the value of the input voltage VIN. In the graph of FIG. 14, the vertical axis represents the value of the input voltage VIN or the output voltage VOUT. In the linear power supply 200 of the second embodiment, the resistance value of the resistor R1, the resistance value of the resistor R2, and the reference voltage VREF are set such that the target value of the output voltage VOUT equals a voltage V1.

In the range where the input voltage VIN is higher than a voltage V2 (=V1+VDS1), the second transistor M2 clamps the drain-source voltage VDS1 of the first transistor M1 substantially at a fixed value. Thus, even in the event of a large variation in the input voltage VIN, in the range where the input voltage VIN is higher than the voltage V2 (=V1+VDS1), the drain-source voltage VDS1 of the first transistor remains substantially at the fixed value. It is thus possible to suppress, in the event of a large variation in the input voltage VIN, a variation in the characteristics of the power supply, and this makes it easy to sustain the stability of the power supply.

Seeing that, in the range where the input voltage VIN is higher than the voltage V2 (=V1+VDS1), the drain-source voltage VDS1 of the first transistor remains substantially at a fixed value, it is preferable that the first transistor M1 be implemented with a transistor with a withstand voltage lower than that of the second transistor M2. This helps reduce the size and cost of the first transistor M1.

Figure 15:
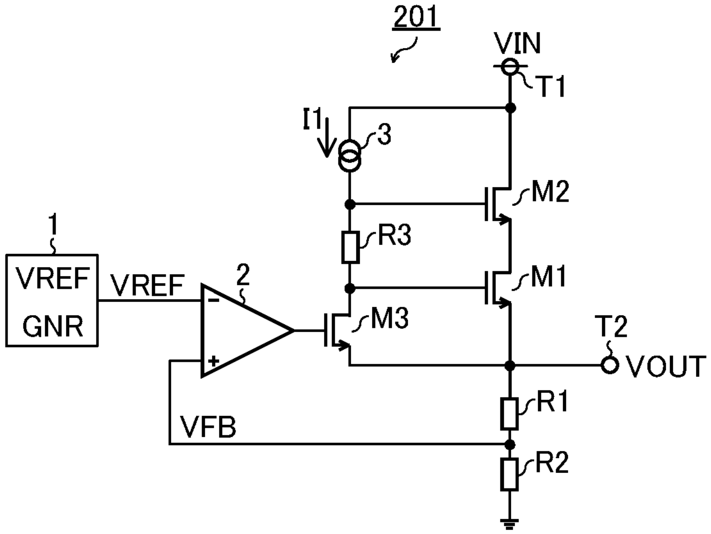
FIG. 15 is a diagram showing a first configuration example of the linear power supply of the second embodiment.

First Configuration Example of the Linear Power Supply of the Second Embodiment FIG. 15 is a diagram showing a first configuration example of the linear power supply according to the second embodiment. The linear power supply 201 of the second embodiment shown in FIG. 15 has a configuration basically similar to that of the linear power supply 101 of the first embodiment, and therefore no detailed description will be repeated.

Figure 16:
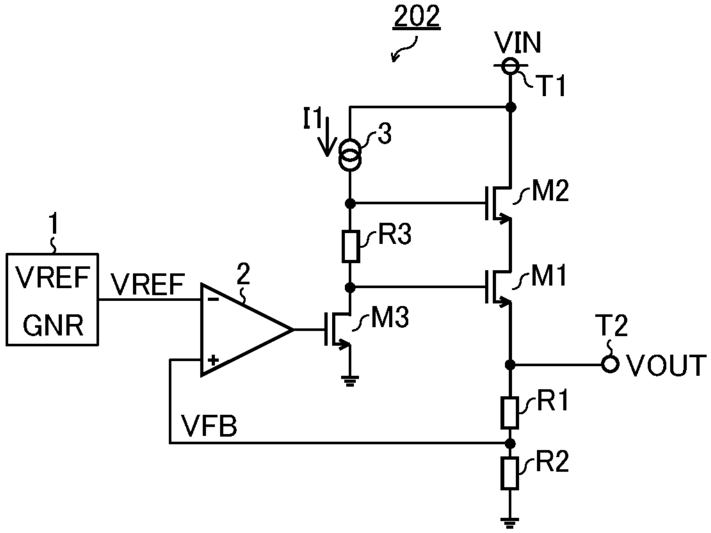
FIG. 16 is a diagram showing a second configuration example of the linear power supply of the second embodiment.

Second Configuration Example of the Linear Power Supply of the Second Embodiment FIG. 16 is a diagram showing a second configuration example of the linear power supply according to the second embodiment. The linear power supply 202 of the second embodiment shown in FIG. 16 has a configuration basically similar to that of the linear power supply 101 of the first embodiment, and therefore no detailed description will be repeated. The linear power supply 202 of the second embodiment shown in FIG. 16 differs from the linear power supply 201 of the second embodiment shown in FIG. 15 in that the source of the third transistor M3 is connected not to the output terminal T2 but to the ground potential.

Figure 17:
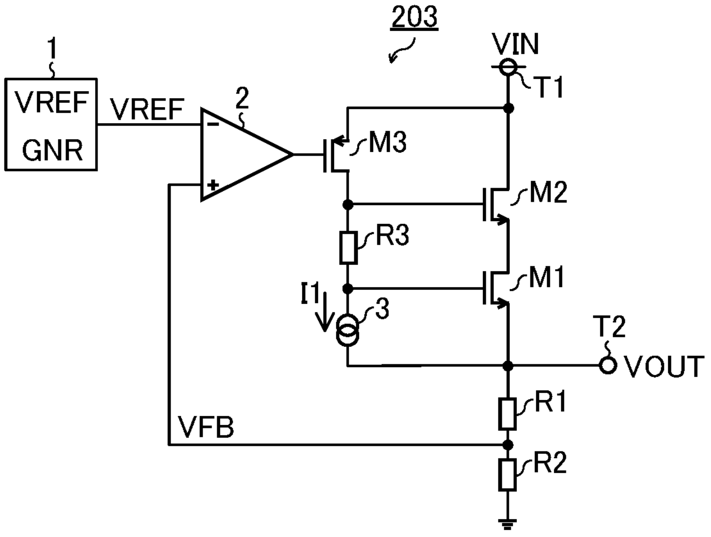
FIG. 17 is a diagram showing a third configuration example of the linear power supply of the second embodiment.

Third Configuration Example of the Linear Power Supply of the Second Embodiment FIG. 17 is a diagram showing a third configuration example of the linear power supply according to the second embodiment. The linear power supply 203 of the second embodiment shown in FIG. 17 has a configuration basically similar to that of the linear power supply 102 of the first embodiment, and therefore no detailed description will be repeated.

Figure 18:
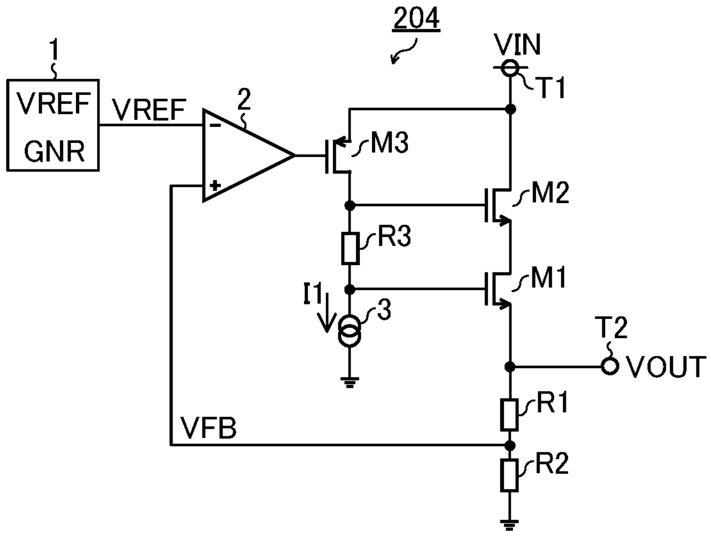
FIG. 18 is a diagram showing a fourth configuration example of the linear power supply of the second embodiment.

Fourth Configuration Example of the Linear Power Supply of the Second Embodiment FIG. 18 is a diagram showing a fourth configuration example of the linear power supply according to the second embodiment. The linear power supply 204 of the second embodiment shown in FIG. 18 has a configuration basically similar to that of the linear power supply 102 of the first embodiment, and therefore no detailed description will be repeated. The linear power supply 204 of the second embodiment shown in FIG. 18 differs from the linear power supply 203 of the second embodiment shown in FIG. 17 in that the second terminal of the current source 3 is connected not to the output terminal T2 but to the ground potential.

Figure 19:
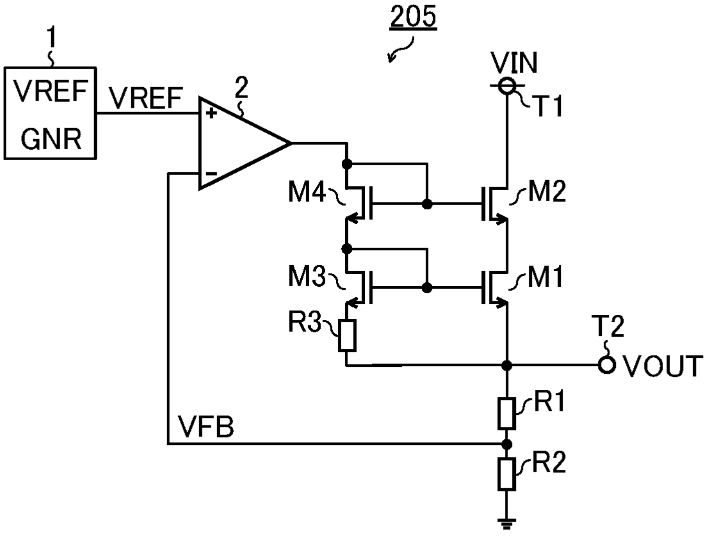
FIG. 19 is a diagram showing a fifth configuration example of the linear power supply of the second embodiment.

Fifth Configuration Example of the Linear Power Supply of the Second Embodiment FIG. 19 is a diagram showing a fifth configuration example of the linear power supply according to the second embodiment. The linear power supply 205 of the second embodiment shown in FIG. 19 has a configuration basically similar to that of the linear power supply 103 of the first embodiment, and therefore no detailed description will be repeated. The second terminal of the resistor R3 may be connected not to the output terminal T2 but to the ground potential.

Figure 20:
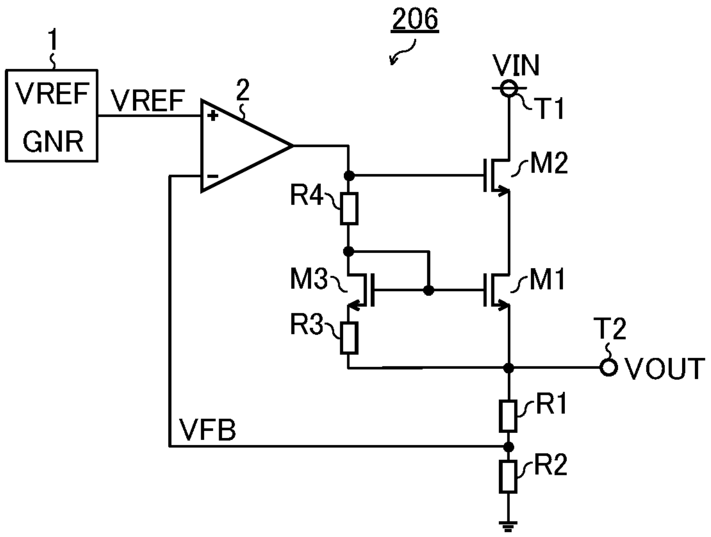
FIG. 20 is a diagram showing a sixth configuration example of the linear power supply of the second embodiment.

Sixth Configuration Example of the Linear Power Supply of the Second Embodiment FIG. 20 is a diagram showing a sixth configuration example of the linear power supply according to the second embodiment. The linear power supply 206 of the second embodiment shown in FIG. 20 has a configuration basically similar to that of the linear power supply 104 of the first embodiment, and therefore no detailed description will be repeated. The second terminal of the resistor R3 may be connected not to the output terminal T2 but to the ground potential.

Figure 21:
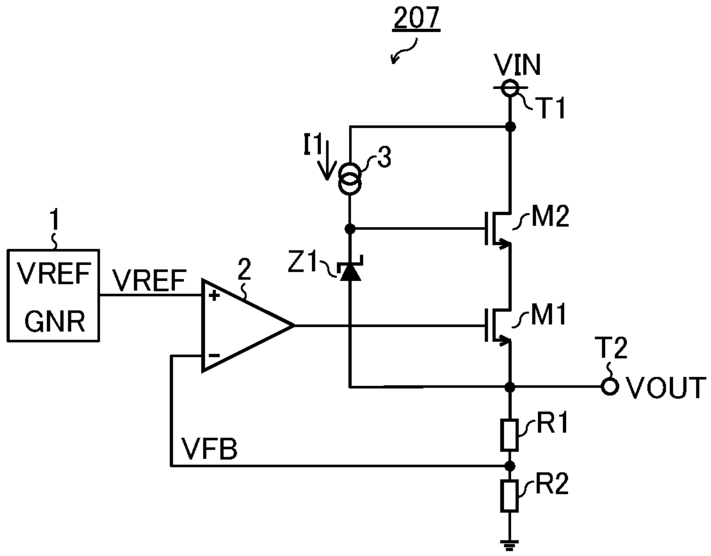
FIG. 21 is a diagram showing a seventh configuration example of the linear power supply of the second embodiment.

Seventh Configuration Example of the Linear Power Supply of the Second Embodiment FIG. 21 is a diagram showing a seventh configuration example of the linear power supply according to the second embodiment. The linear power supply 207 of the second embodiment shown in FIG. 21 has a configuration basically similar to that of the linear power supply 105 of the first embodiment, and therefore no detailed description will be repeated. The cathode of the Zener diode may be connected not to the output terminal T2 but to the ground potential.

Linear Power Supply of a Third Reference Example

Figure 22:
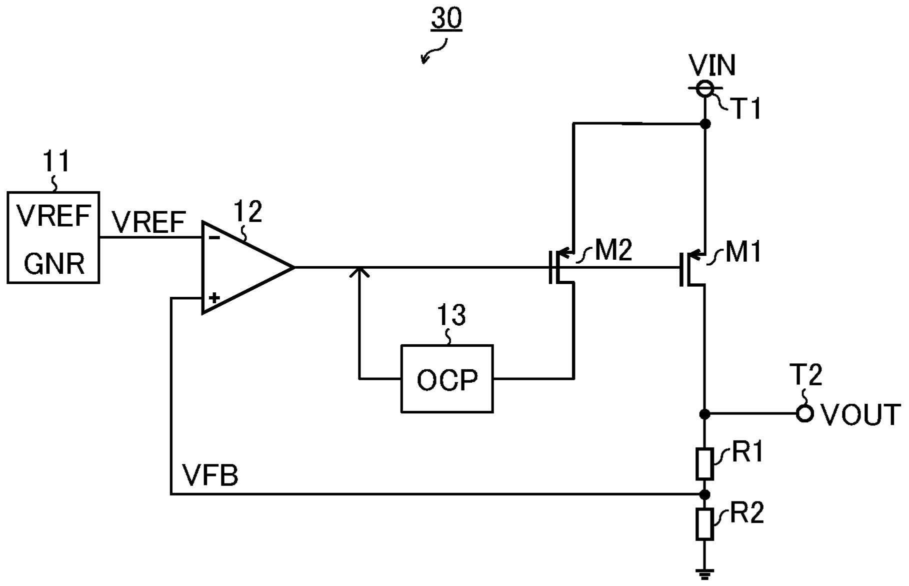
FIG. 22 is a diagram showing an outline of the configuration of a linear power supply of a third reference example.

FIG. 22 is a diagram showing an outline of the configuration of a linear power supply of a third reference example. The linear power supply 30 of the third reference example includes a reference voltage generator 11, an amplifier 12, a first transistor M1 as output transistor, a second transistor M2, resistors R1 to R3, and an overcurrent protection circuit 13. The linear power supply 30 of the third reference example busts (steps down) an input voltage VIN fed in via an input terminal T1 to generate an output voltage VOUT. The output voltage VOUT is fed out via an output terminal T2.

The first transistor M1 is connected between the input terminal T1 and the output terminal T2. The first transistor M1 is controlled according to the output signal of the amplifier 12. More specifically, the conductance of the first transistor M1 (put inversely, its on-resistance value) is controlled according to the output signal of the amplifier 12. In the linear power supply 30 of the third reference example, the first transistor M1 is implemented with a PMOSFET. Accordingly, as the gate voltage of the first transistor M1 becomes lower, the conductance of the first transistor M1 increases and the output voltage VOUT rises. Reversely, as the gate voltage of the first transistor M1 becomes higher, the conductance of the first transistor M1 decreases and the output voltage VOUT falls. The first transistor M1 may be implemented with, instead of a PMOSFET, a PNP bipolar transistor.

The resistors R1 and R2 convert the output voltage VOUT into a feedback voltage VFB. The resistor R1 has a resistance value of r1 and the resistor R2 has a resistance value of r2. The feedback voltage VFB is given by the following expression:

$$VFB=VOUT\times[r2/(r1+r2)]$$

In applications where the output voltage VOUT falls within the input dynamic range of the amplifier 12, the resistors R1 and R2 can be omitted and, as the feedback voltage VFB, the output voltage VOUT as it is can be fed directly to the amplifier 12.

The reference voltage generator 11 generates and output a reference voltage VREF. The reference voltage generator 11 can be implemented suitably with, for example, a band-gap voltage source with low dependence on source voltage or temperature.

A controller including the amplifier 12 controls the first transistor M1 based on the difference between the feedback voltage VFB, which is fed to the non-inverting input terminal (+) of the amplifier 12, and the reference voltage VREF, which is fed to the inverting input terminal (−) of the amplifier 12. More specifically, the controller including the amplifier 2 controls the first transistor M1 such that the feedback voltage VFB is equal to the reference voltage VREF. The controller including the amplifier 2 increases the gate voltage of the first transistor M1 as the difference ΔV (=VFB−VREF) between the feedback voltage VFB and the reference voltage VREF becomes higher, and decreases the gate voltage of the first transistor M1 as the difference ΔV becomes lower.

Depending on the specific circuit configuration of the controller including the amplifier 12, the non-inverting input terminal (+) can be fed with the reference voltage VREF and the inverting input terminal (−) with the feedback voltage VFB.

In the linear power supply 30 of the third reference example, the second transistor M2 is implemented with a PMOSFET. The second transistor M2 may be implemented with, instead of a PMOSFET, a PNP bipolar transistor.

The source of the second transistor M2 is connected to the input terminal T1, and the gate of the second transistor M2 is connected to the output terminal of the amplifier 12 an to the gate of the first transistor M1.

The first and second transistors M1 and M2 constitute a current mirror circuit. The mirrored current is output from the drain of the second transistor M2 to the overcurrent protection circuit 13. The size ratio between the first and second transistors M1 and M2 is N:1 and the mirrored current equals 1/N times (where N>1) the output current of the linear power supply 30 of the third reference example.

Based on the mirrored current, the overcurrent protection circuit 13 protects from an overcurrent the linear power supply 30 itself of the third reference example and the load connected to the output terminal T2.

A graph that shows the relationship between the input voltage VIN to and the output voltage VOUT from the linear power supply 30 of the third reference example is identical with the graph, shown in FIG. 2, that shows the relationship between the input voltage VIN to and the output voltage VOUT from the linear power supply 10 of the first reference example.

If, with respect to a MOSFET, the gate-source voltage VGS is close to the threshold voltage Vth, a large variation in the drain-source voltage VDS causes a large variation in the drain current Id (see FIG. 3). That is, if the gate-source voltage VGS is close to the threshold voltage Vth, a large variation in the drain-source voltage VDS causes a large variation in the characteristics of the MOSFET.

Accordingly, if the first transistor M1 is implemented with a transistor like the one just described with which, when it operates around the border of the cut-off region, a large change in its first terminal-to-second terminal voltage causes a large change in its characteristics and if the first transistor M1 is controlled in such a way that the controller including the amplifier 12 operates around the cut-off region, the linear power supply 30 of the third reference example has the following drawback.

With the linear power supply 30 of the third reference example, a large variation in the input voltage VIN causes a large variation in the first terminal-to-second terminal voltage of the first transistor M1 and hence a variation in the characteristics of the power supply, and this makes it difficult to sustain the stability of the power supply.

Moreover, to cope with a large variation in the first terminal-to-second terminal voltage of the first transistor M1, the first transistor M1 has to be a high-withstand-voltage transistor. Implementing the first transistor M1 with a high-withstand-voltage transistor leads to lower accuracy in the size ratio between the first and second transistors M1 and M2 and hence lower accuracy in overcurrent protection.

As a solution to the drawbacks mentioned above, a third embodiment will now be presented.

Linear Power Supply of a Third Embodiment

Figure 23:
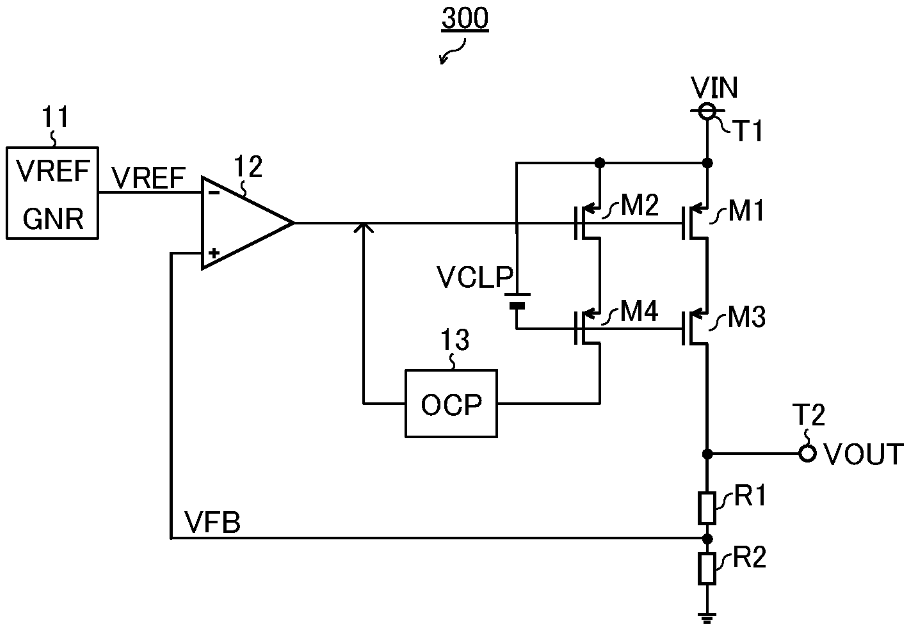
FIG. 23 is a diagram showing an outline of the configuration of a linear power supply of a third embodiment.

FIG. 23 is a diagram showing an outline of the configuration of a linear power supply according to a third embodiment. The linear power supply 300 of the third embodiment is based on the linear power supply 30 (FIG. 22) of the third reference example described previously, and includes, in addition to the components mentioned previously, a third transistor M3 and a fourth transistor M4.

In the linear power supply 300 of the third embodiment, the third and fourth transistors M3 and M4 are implemented with PMOSFETs. The third and fourth transistors M3 and M4 may be implemented with, instead of PMOSFETs, PNP bipolar transistors.

The overcurrent protection circuit 13 receives the drain current of the fourth transistor M4. The drain current of the fourth transistor M4 has a current value equal to that of the drain current of the second transistor M2 (i.e., the mirrored current in the current mirror circuit constituted by the first and second transistors M1 and M2), and is a current based on the drain current of the second transistor M2. Accordingly, based on the drain current of the second transistor M2, the overcurrent protection circuit 13 protects from an overcurrent the linear power supply 300 itself of the third embodiment and the load connected to the output terminal T2.

In the linear power supply 300 of the third embodiment, the third transistor M3 is connected between the first transistor M1 and the output terminal T2. The third transistor M3 is configured to clamp the drain-source voltage VDS1 of the first transistor M1. In a case where the first transistor M1 is implemented with, instead of a PMOSFET, a PNP bipolar transistor, the third transistor M3 is configured to clamp the collector-emitter voltage of the first transistor M1.

A control voltage (VIN−VCLP) lower than the input voltage VIN by a predetermined value is fed to the gate of the third transistor M3. Thus, the drain-source voltage VDS1 of the first transistor M1 is a voltage equal to the sum of the voltage VCLP with the predetermined value and the threshold voltage Vth2 of the third transistor M3. That is, the third transistor M3 clamps the drain-source voltage VDS1 of the first transistor M1 substantially at a fixed value.

A graph that shows the relationship between the input voltage VIN to and the output voltage VOUT from the linear power supply 300 of the third embodiment is identical with the graph, shown in FIG. 5, that shows the relationship between the input voltage VIN to and the output voltage VOUT from the linear power supply 100 of the first embodiment. In the linear power supply 300 of the third embodiment, the resistance value of the resistor R1, the resistance value of the resistor R2, and the reference voltage VREF are set such that the target value of the output voltage VOUT equals a voltage V1.

In the range where the input voltage VIN is higher than a voltage V2 (=V1+VDS1), the third transistor M3 clamps the drain-source voltage VDS1 of the first transistor M1 substantially at a fixed value. Thus, even in the event of a large variation in the input voltage VIN, in the range where the input voltage VIN is higher than a voltage V2 (=V1+VDS1), the drain-source voltage VDS1 of the first transistor remains substantially at the fixed value. It is thus possible to suppress, in the event of a large variation in the input voltage VIN, a variation in the characteristics of the power supply, and this makes it easy to sustain the stability of the power supply.

Seeing that, in the range where the input voltage VIN is higher than the voltage V2 (=V1+VDS1), the drain-source voltage VDS1 of the first transistor remains substantially at a fixed value, it is preferable that the first transistor M1 be implemented with a transistor with a withstand voltage lower than that of the third transistor M3. This helps reduce the size and cost of the first transistor M1.

In the linear power supply 300 of the third embodiment, a low-withstand-voltage transistor can be used as the first transistor M1. This helps enhance the accuracy of the size ratio between the first and second transistors and enhance the accuracy of overcurrent protection.

For example, the low-withstand-voltage first and second transistors M1 and M2 can be implemented with transistors of a CMOS (complementary metal-oxide-semiconductor) structure, and the high-withstand-voltage third and fourth transistors M3 and M4 can be implemented with transistors of a DMOS (double-diffused metal-oxide-semiconductor) structure.

A transistor of a CMOS structure is, in other words, a transistor that is formed on a semiconductor chip by a CMOS process. Likewise, a transistor of a DMOS structure is, in other words, a transistor that is formed on a semiconductor chip by a DMOS process.

The size ratio between a pair of transistors of a CMOS structure formed by a single CMOS process has higher accuracy than the size ratio between a pair of transistors of a DMOS structure formed by a single DMOS process. Accordingly, implementing the first and second transistors M1 and M2 with transistors of a CMOS structure makes it easy to enhance the accuracy of overcurrent protection.

Moreover, in the linear power supply 300 of the third embodiment, the drain-source voltage of the second transistor M2 and the drain-source voltage of the first transistor M1 have equal values. This helps further enhance the accuracy of the drain current of the second transistor M2 (i.e., the mirrored current in the current mirror circuit constituted by the first and second transistors M1 and M2) and further enhance the accuracy of overcurrent protection.

First Configuration Example of the Linear Power Supply of the Third Embodiment

Figure 24:
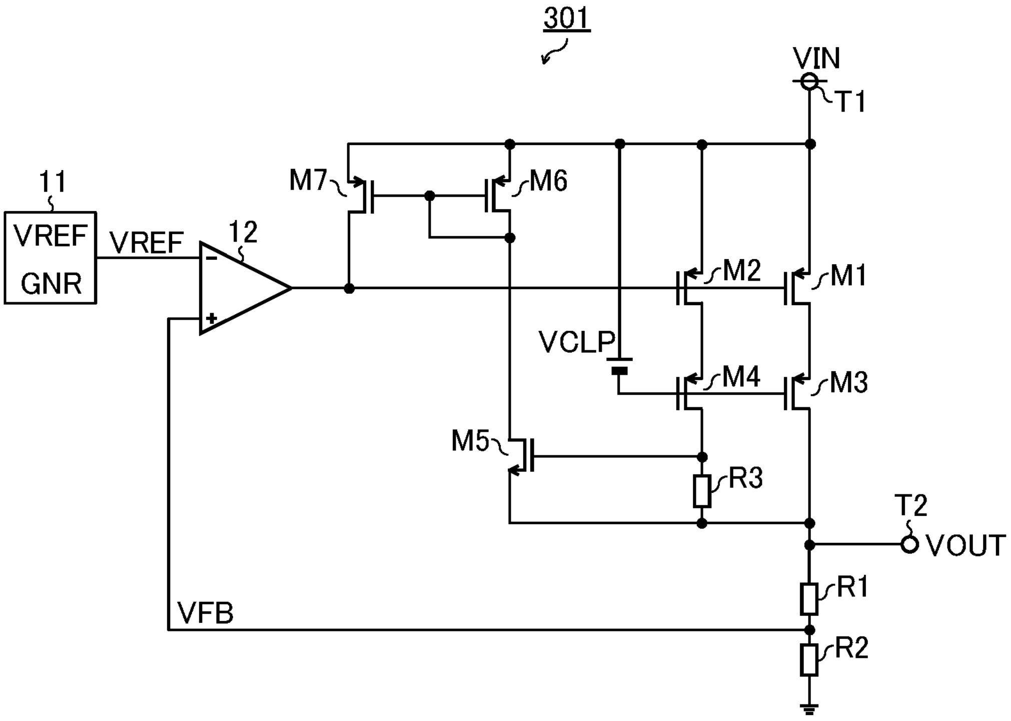
FIG. 24 is a diagram showing a first configuration example of the linear power supply of the third embodiment.

FIG. 24 is a diagram showing a first configuration example of the linear power supply according to the third embodiment. The linear power supply 301 of the third embodiment shown in FIG. 24 includes, as an overcurrent protection circuit (see FIG. 23), a fifth to a seventh transistor M5 to M7 and a resistor R3.

In the linear power supply 301 of the third embodiment, the fifth transistor M5 is implemented with an NMOSFET (N-channel MOSFET), and the sixth and seventh transistors M6 and M7 are implemented with PMOSFETs.

The first terminal of the resistor R3 and the gate of the fifth transistor M5 are connected to the drain of the fourth transistor. The second terminal of the resistor R3 and the source of the fifth transistor M5 are connected to the output terminal T2.

The sixth and seventh transistors M6 and M7 constitute a current mirror circuit. The sources of the sixth and seventh transistors M6 and M7 are connected to the input terminal T1. The gate and the drain of the sixth transistor M6 and the gate of the seventh transistor M7 are connected to the drain of the fifth transistor M5. The drain of the seventh transistor M7 is connected to the gates of the first and second transistors M1 and M2 and to the output terminal of the amplifier 12.

As the mirrored current output from the second transistor M2 increases, the terminal-to-terminal potential difference across the resistor R3 increases. As a result, the drain-source voltage of the fifth transistor M5 decreases, the gate-source voltages of the sixth and seventh transistors M6 and M7 increase, and the gate voltage of the first transistor M1 increases; in this way, the output current of the linear power supply 301 of the third embodiment is limited.

Second Configuration Example of the Linear Power Supply of the Third Embodiment

Figure 25:
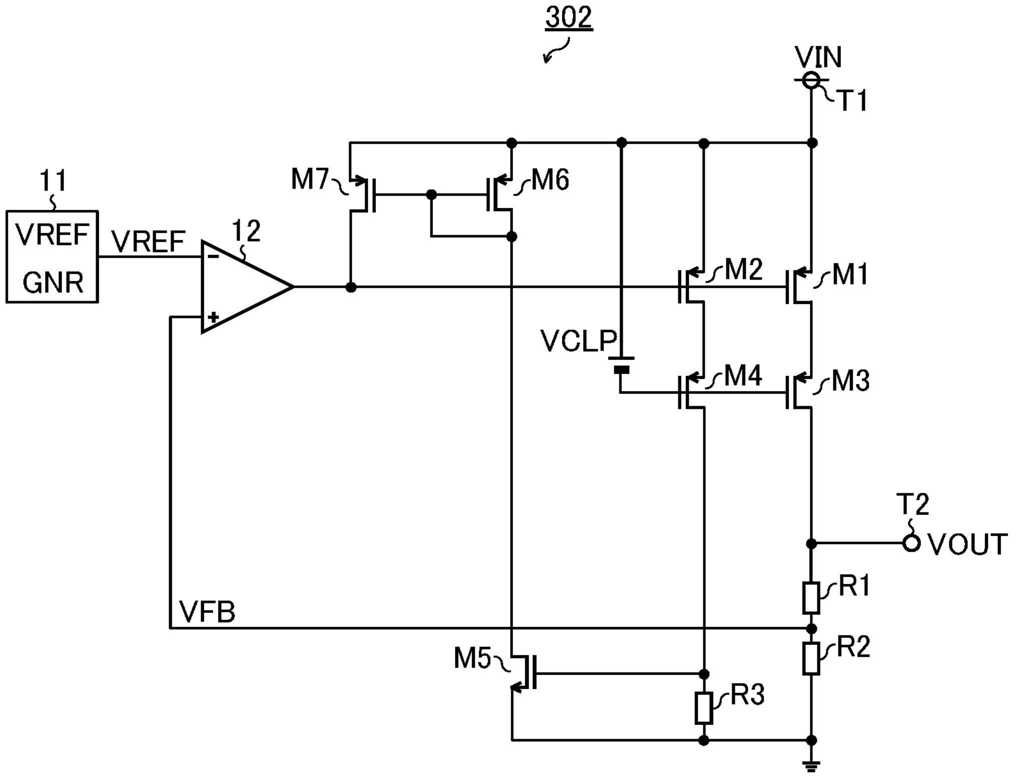
FIG. 25 is a diagram showing a second configuration example of the linear power supply of the third embodiment.

FIG. 25 is a diagram showing a second configuration example of the linear power supply of the third embodiment. The linear power supply 302 of the third embodiment shown in FIG. 25 differs from the linear power supply 301 of the third embodiment shown in FIG. 24 in that the source of the fifth transistor and the second terminal of the resistor R3 are connected not to the output terminal T2 but to the ground potential, and is otherwise similar to the linear power supply 301 of the third embodiment shown in FIG. 24.

First Specific Example of the Linear Power Supply Shown in FIG. 24

Figure 26:
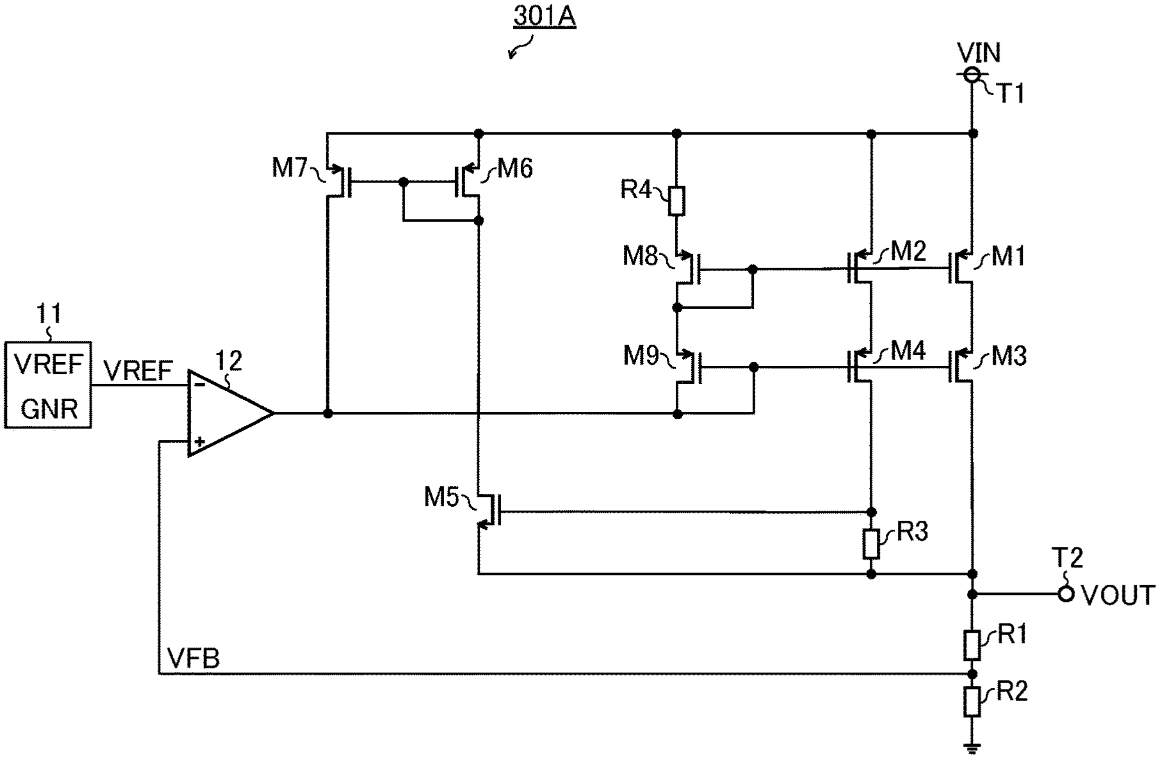
FIG. 26 is a diagram showing a first specific example of the linear power supply shown in FIG. 24.

FIG. 26 is a diagram showing a first specific example of the linear power supply 301 shown in FIG. 24. In the linear power supply 301A of the third embodiment shown in FIG. 26, a controller that controls the first transistor M1 includes an amplifier 12, an eighth transistor M8, a ninth transistor M9, and a resistor R4.

In the linear power supply 301A of the third embodiment, the eighth transistor M8 is implemented with a PMOSFET, and the ninth transistor M9 is implemented with a PMOSFET. The non-inverting input terminal (+) of the amplifier 12 is fed with the feedback voltage VFB, and the inverting input terminal (−) of the amplifier 12 is fed with the reference voltage VREF. The output signal of the amplifier 12 is fed to the drain and the gate of the ninth transistor M9, to the gate of the third transistor M3, and to the gate of the fourth transistor M4.

The first terminal of the resistor R4 is connected to the input terminal T1. The second terminal of the resistor R4 is connected to the source of the eighth transistor M8. The gate and the drain of the eighth transistor M8 and the source of the ninth transistor M9 are connected to the gates of the first and second transistors M1 and M2.

The first, second, and eighth transistors M1, M2, and M8 constitute a first current mirror circuit, and the third, fourth, and ninth transistors M3, M4, and M9 constitute a second current mirror circuit. As the difference ΔV (=VFB−VREF) between the feedback voltage VFB and the reference voltage VREF becomes lower, the amplifier 12 decreases the gate voltage of the ninth transistor M9 and decreases the gate voltage of the first transistor M1; as the difference ΔV becomes higher, the amplifier 12 increases the gate voltage of the ninth transistor M9 and increases the gate voltage of the first transistor M1.

The gate voltage of the third transistor M3 has a value equal to the input voltage VIN minus the sum of the voltage drop across the resistor R4, the threshold voltage of the eighth transistor M8, and the threshold voltage of the ninth transistor M9. The third transistor M3 clamps the drain-source voltage of the first transistor M1.

The resistor R4 is a resistor for gain adjustment; accordingly, where no gain adjustment is required, the resistor R4 may be omitted. The eighth transistor M8 may be implemented with, instead of a PMOSFET, a PNP bipolar transistor. The ninth transistor M9 may be implemented with, instead of a PMOSFET, a PNP bipolar transistor.

Second Specific Example of the Linear Power Supply Shown in FIG. 24

Figure 27:
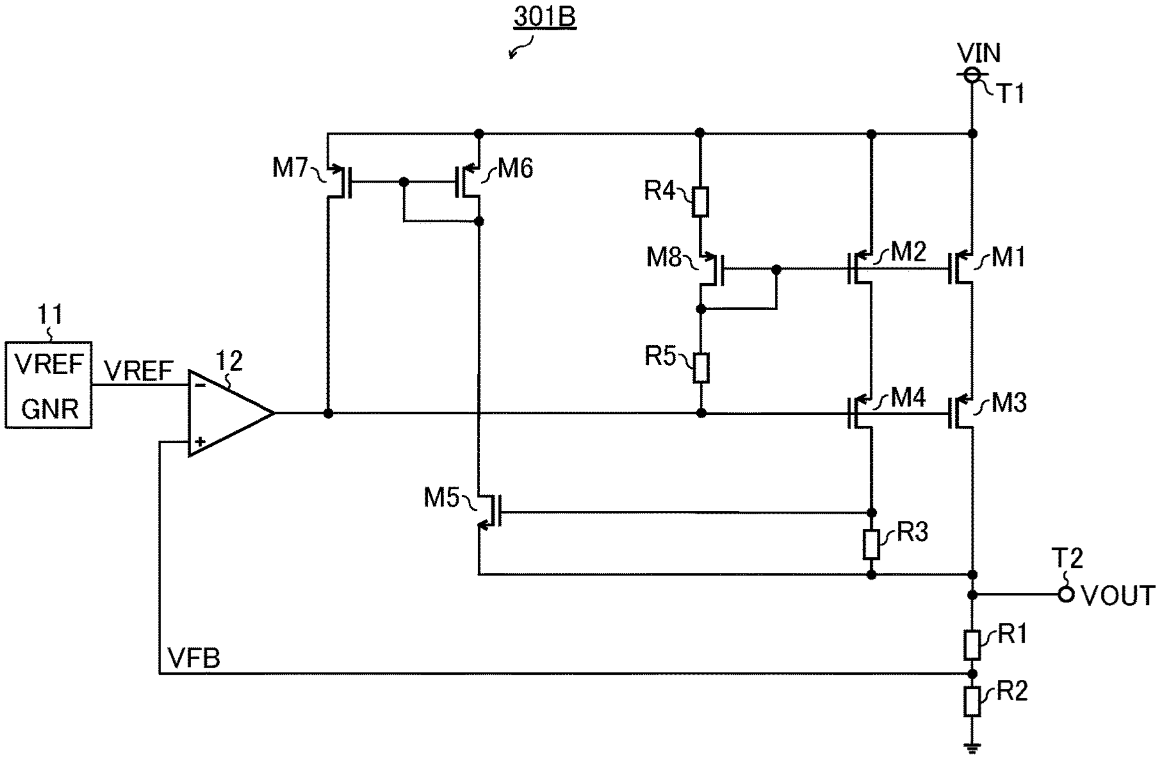
FIG. 27 is a diagram showing a second specific example of the linear power supply shown in FIG. 24.

FIG. 27 is a diagram showing a second specific example of the linear power supply 301 shown in FIG. 24. In the linear power supply 301B of the third embodiment shown in FIG. 27, a controller that controls the first transistor M1 includes an amplifier 12, an eighth transistor M8, and resistors R4 and R5.

In the linear power supply 301B of the third embodiment, the eighth transistor M8 is implemented with a PMOSFET. The non-inverting input terminal (+) of the amplifier 12 is fed with the feedback voltage VFB, and the inverting input terminal (−) of the amplifier 12 is fed with the reference voltage VREF. The output signal of the amplifier 12 is fed to the gate of the third transistor M3.

The first terminal of the resistor R4 is connected to the input terminal T1. The second terminal of the resistor R4 is connected to the source of the eighth transistor M8. The gate and the drain of the eighth transistor M8 and the first terminal of the resistor R5 are connected to the gates of the first and second transistors M1 and M2. The second terminal of the resistor R5 is connected to the output terminal of the amplifier 12 and to the gates of the third and fourth transistors M3 and M4.

The first, second, and eighth transistors M1, M2, and M8 constitute a current mirror circuit. As the difference ΔV (=VFB−VREF) between the feedback voltage VFB and the reference voltage VREF becomes lower, the amplifier 12 decreases the gate voltage of the first transistor M1; as the difference ΔV becomes higher, the amplifier 12 increases the gate voltage of the first transistor M1.

The gate voltage of the third transistor M3 has a value equal to the input voltage VIN minus the sum of the voltage drop across the resistor R4, the threshold voltage of the eighth transistor M8, and the voltage drop across the resistor R5. The third transistor M3 clamps the drain-source voltage of the first transistor M1.

The resistor R4 is a resistor for gain adjustment; accordingly, where no gain adjustment is required, the resistor R4 may be omitted. The eighth transistor M8 may be implemented with, instead of a PMOSFET, a PNP bipolar transistor.

Third Specific Example of the Linear Power Supply Shown in FIG. 24

Figure 28:
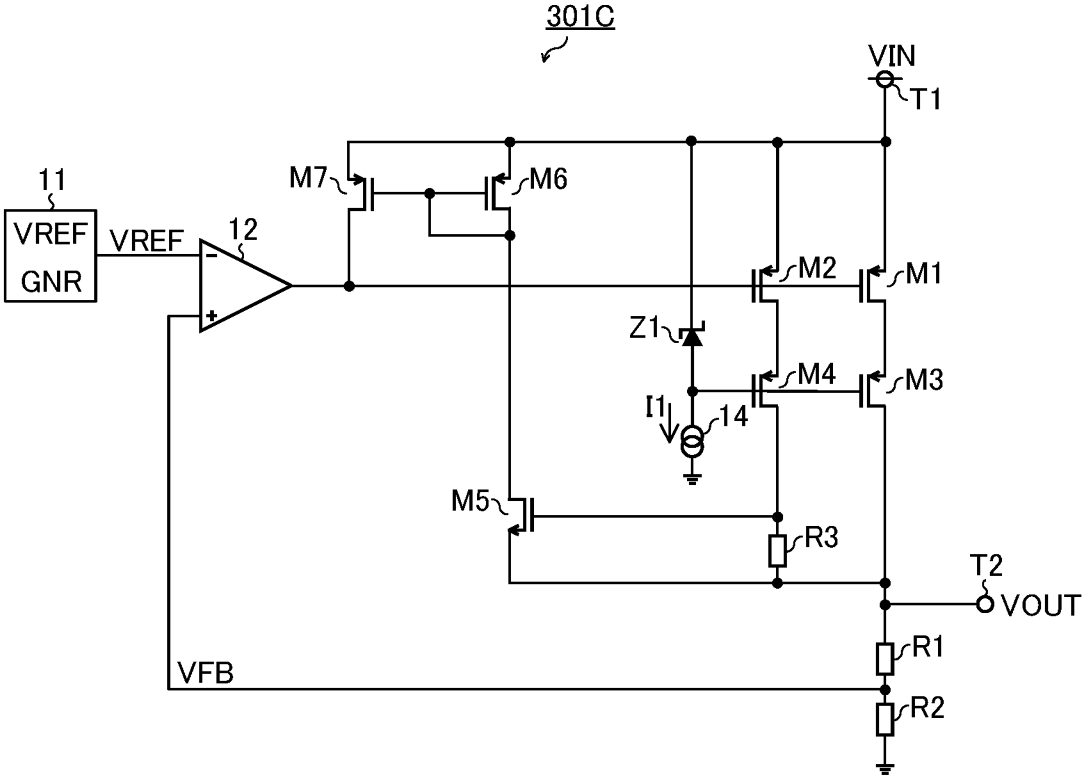
FIG. 28 is a diagram showing a third specific example of the linear power supply shown in FIG. 24.

FIG. 28 is a diagram showing a third specific example of the linear power supply shown in FIG. 24. In the linear power supply 301C of the third embodiment shown in FIG. 28, a controller that controls the first transistor M1 includes an amplifier 12. In the linear power supply 301C of the third embodiment shown in FIG. 28, a control voltage feeder that feeds the control terminal of the third transistor M3 with a control voltage lower than the input voltage VIN by a predetermined value includes a Zener diode Z1 and a current source 14.

The non-inverting input terminal (+) of the amplifier 12 is fed with the feedback voltage VFB, and the inverting input terminal (−) of the amplifier 12 is fed with the reference voltage VREF. The output signal of the amplifier 12 is fed to the gate of the first transistor M1.

The cathode of the Zener diode Z1 is connected to the input terminal T1. The anode of the Zener diode Z1 is connected to the gate of the third transistor M3 and to the first terminal of the current source 14. The second terminal of the current source 14 is connected to the ground potential.

The gate voltage of the third transistor M3 has a value equal to the input voltage VIN minus the Zener voltage of the Zener diode Z1. The third transistor M3 clamps the drain-source voltage of the first transistor M1.

With the linear power supply 301C of the third embodiment shown in FIG. 28, where the control voltage feeder is not included in the controller, it is easy for the controller to control the first transistor M1.

Linear Power Supply of a Fourth Reference Example

Figure 29:
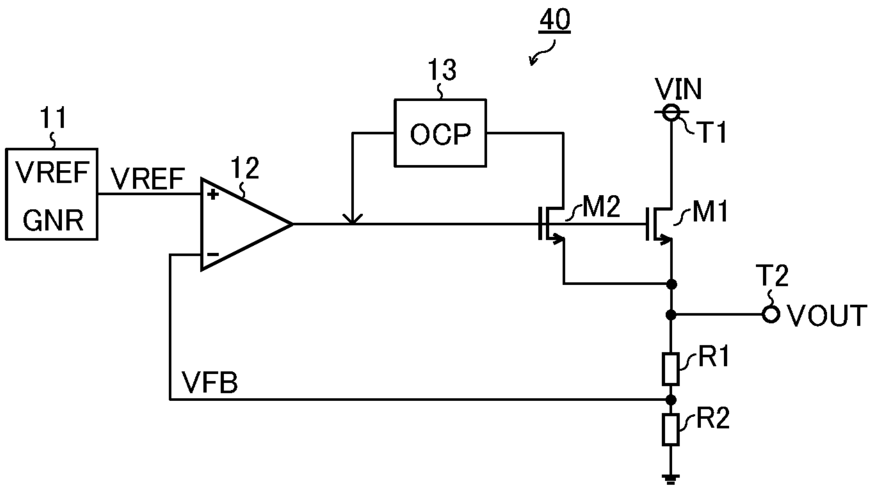
FIG. 29 is a diagram showing an outline of the configuration of a linear power supply of a fourth reference example.

FIG. 29 is a diagram showing an outline of the configuration of a linear power supply of a fourth reference example. The linear power supply 40 of the fourth reference example differs from the linear power supply 30 of the third reference example in that the first transistor M1 as an output transistor is an NMOSFET and that the second transistor M2 is an NMOSFET, and is otherwise basically similar to the linear power supply 30 of the third reference example.

In the linear power supply 40 of the fourth reference example, the first and second transistors M1 and M2 may be implemented with, instead of NMOSFETs, NPN bipolar transistors.

A graph that shows the relationship between the input voltage VIN to and the output voltage VOUT from the linear power supply 40 of the fourth reference example is identical with the graph, shown in FIG. 12, that shows the relationship between the input voltage VIN to and the output voltage VOUT from the linear power supply 20 of the second reference example. In the linear power supply 40 of the fourth reference example, the resistance value of the resistor R1, the resistance value of the resistor R2, and the reference voltage VREF are set such that the target value of the output voltage VOUT equals a voltage V1.

In the linear power supply 40 of the fourth reference example, as in the linear power supply 30 of the third reference example, a large variation in the input voltage VIN causes a large variation in the first terminal-to-second terminal voltage of the first transistor M1 and hence a variation in the characteristics of the power supply, and this makes it difficult to sustain the stability of the power supply.

Moreover, to cope with a large variation in the first terminal-to-second terminal voltage of the first transistor M1, the first transistor M1 has to be a high-withstand-voltage transistor. Implementing the first transistor M1 with a high-withstand-voltage transistor leads to lower accuracy in the size ratio between the first and second transistors M1 and M2 and hence lower accuracy in overcurrent protection.

As a solution to the drawbacks mentioned above, a fourth embodiment will now be presented.

Linear Power Supply of a Fourth Embodiment

Figure 30:
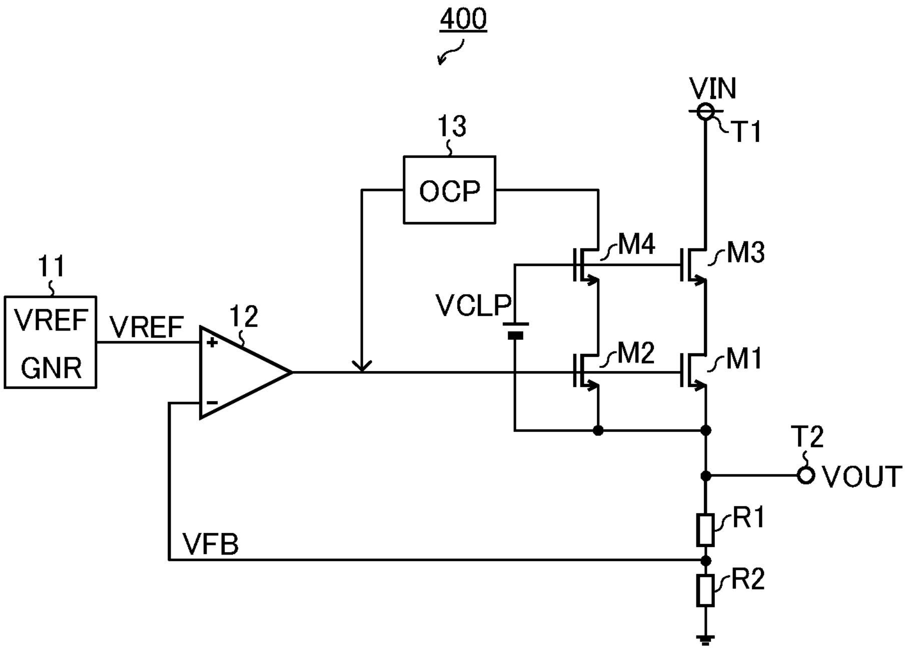
FIG. 30 is a diagram showing an outline of the configuration of a linear power supply of a fourth embodiment.

FIG. 30 is a diagram showing an outline of the configuration of a linear power supply according to a fourth embodiment. The linear power supply 400 of the fourth embodiment is based on the linear power supply 40 (see FIG. 29) of the fourth reference example described previously, and includes, in addition to the components mentioned previously, a third transistor M3 and a fourth transistor M4.

The linear power supply 400 of the fourth embodiment has a configuration basically similar to that of the linear power supply 300 of the third embodiment, and therefore no detailed description will be repeated.

A graph that shows the relationship between the input voltage VIN to and the output voltage VOUT from the linear power supply 400 of the fourth embodiment is identical with the graph, shown in FIG. 14, that shows the relationship between the input voltage VIN to and the output voltage VOUT from the linear power supply 200 of the second embodiment. In the linear power supply 400 of the fourth embodiment, the resistance value of the resistor R1, the resistance value of the resistor R2, and the reference voltage VREF are set such that the target value of the output voltage VOUT equals a voltage V1.

In the range where the input voltage VIN is higher than a voltage V2 (=V1+VDS1), the third transistor M3 clamps the drain-source voltage VDS1 of the first transistor M1 substantially at a fixed value. Thus, even in the event of a large variation in the input voltage VIN, in the range where the input voltage VIN is higher than a voltage V2 (=V1+VDS1), the drain-source voltage VDS1 of the first transistor remains substantially at the fixed value. It is thus possible to suppress, in the event of a large variation in the input voltage VIN, a variation in the characteristics of the power supply, and this makes it easy to sustain the stability of the power supply.

Seeing that, in the range where the input voltage VIN is higher than the voltage V2 (=V1+VDS1), the drain-source voltage VDS1 of the first transistor remains substantially at a fixed value, it is preferable that the first transistor M1 be implemented with a transistor with a withstand voltage lower than that of the third transistor M3. This helps reduce the size and cost of the first transistor M1.

In the linear power supply 400 of the fourth embodiment, a low-withstand-voltage transistor can be used as the first transistor M1. This helps enhance the accuracy of the size ratio between the first and second transistors and enhance the accuracy of overcurrent protection.

For example, the low-withstand-voltage first and second transistors M1 and M2 can be implemented with transistors of a CMOS (complementary metal-oxide-semiconductor) structure, and the high-withstand-voltage third and fourth transistors M3 and M4 can be implemented with transistors of a DMOS (double-diffused metal-oxide-semiconductor) structure.

The size ratio between a pair of transistors of a CMOS structure formed by a single CMOS process has higher accuracy than the size ratio between a pair of transistors of a DMOS structure formed by a single DMOS process. Accordingly, implementing the first and second transistors M1 and M2 with transistors of a CMOS structure makes it easy to enhance the accuracy of overcurrent protection.

Moreover, in the linear power supply 400 of the fourth embodiment, the drain-source voltage of the second transistor M2 and the drain-source voltage of the first transistor M1 have equal values. This helps further enhance the accuracy of the drain current of the second transistor M2 (i.e., the mirrored current in the current mirror circuit constituted by the first and second transistors M1 and M2) and further enhance the accuracy of overcurrent protection.

Figure 31:
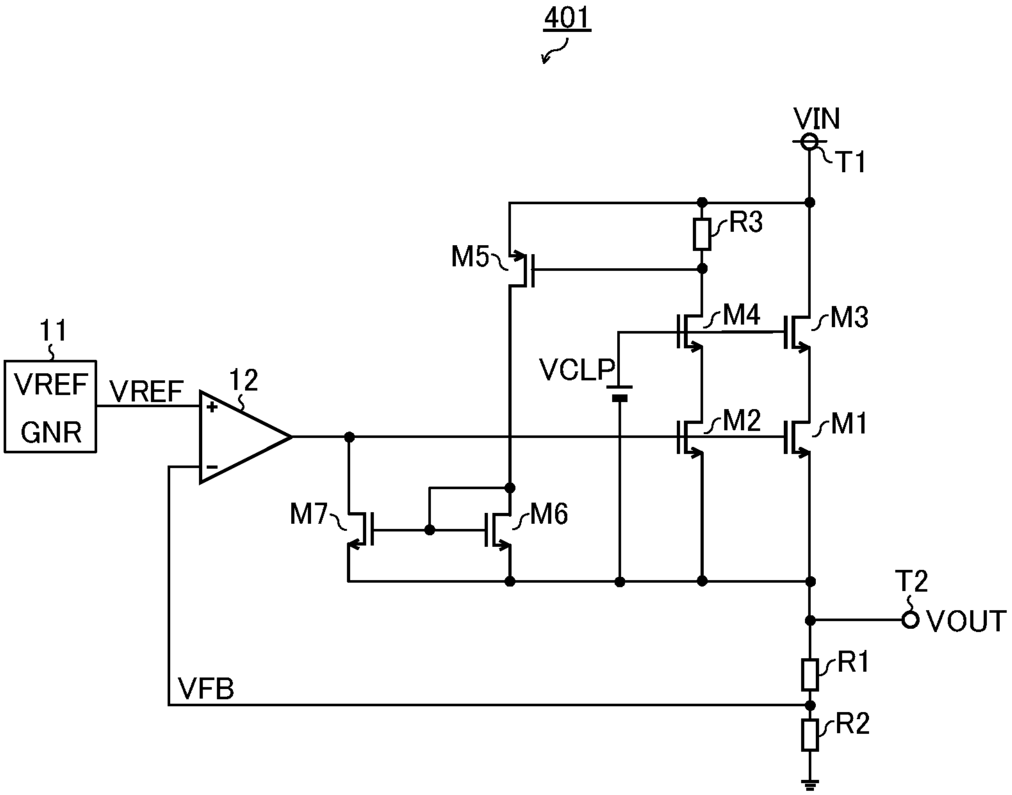
FIG. 31 is a diagram showing one configuration example of the linear power supply of the fourth embodiment.

One Configuration Example of the Linear Power Supply of the Fourth Embodiment FIG. 31 is a diagram showing one configuration example of the linear power supply according to the fourth embodiment. The linear power supply 401 of the fourth embodiment shown in FIG. 31 has a configuration basically similar to that of the linear power supply 301 of the third embodiment, and therefore no detailed description will be repeated.

First Specific Example of the Linear Power Supply Shown in FIG. 31

Figure 32:
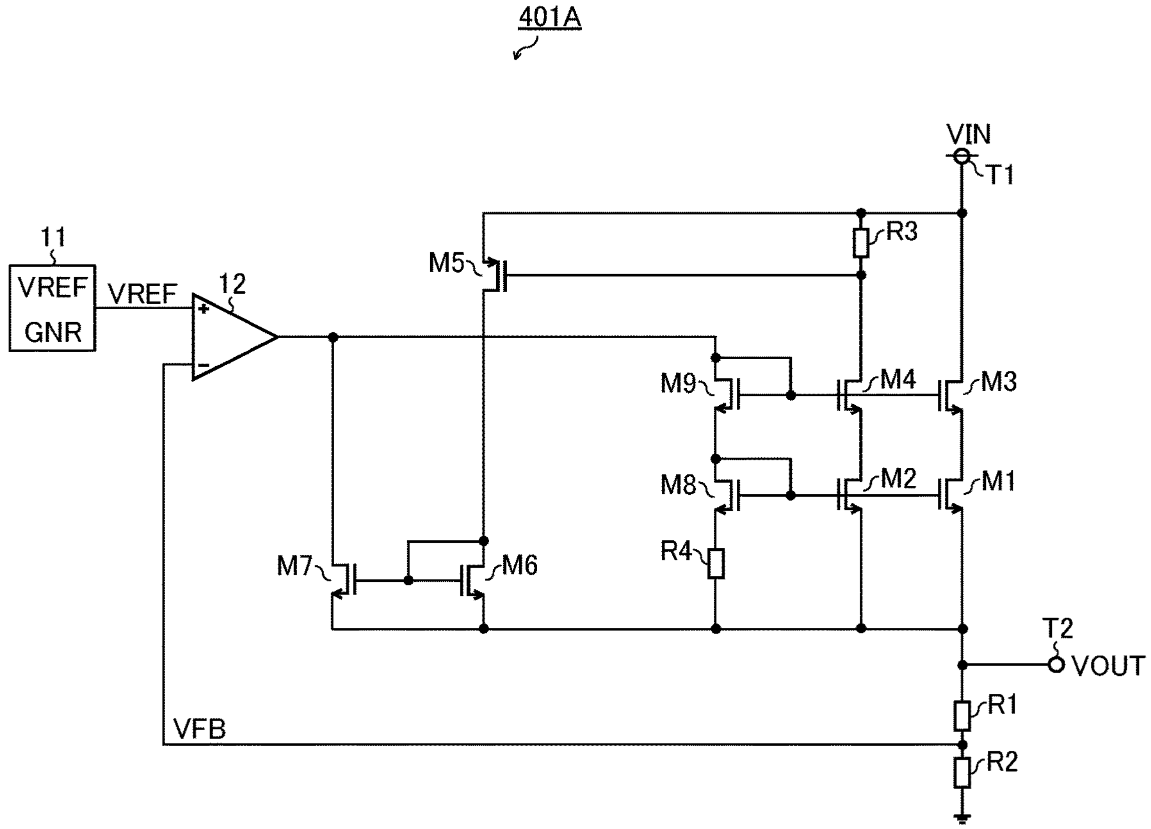
FIG. 32 is a diagram showing a first specific example of the linear power supply shown in FIG. 31.

FIG. 32 is a diagram showing a first specific example of the linear power supply shown in FIG. 31. The linear power supply 401A of the fourth embodiment shown in FIG. 32 has a configuration basically similar to that of the linear power supply 301A of the third embodiment, and therefore no detailed description will be repeated.

Second Specific Example of the Linear Power Supply Shown in FIG. 31

Figure 33:
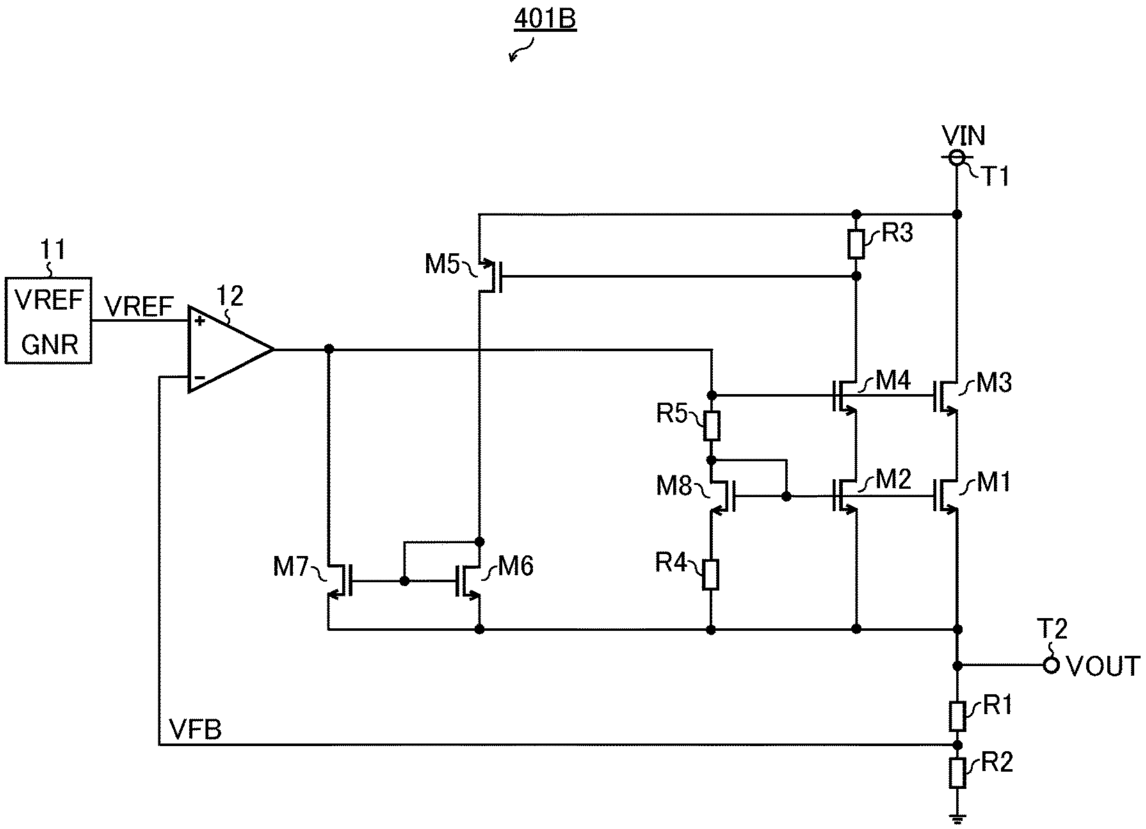
FIG. 33 is a diagram showing a second specific example of the linear power supply shown in FIG. 31.

FIG. 33 is a diagram showing a second specific example of the linear power supply shown in FIG. 31. The linear power supply 401B of the fourth embodiment shown in FIG. 33 has a configuration basically similar to that of the linear power supply 301B of the third embodiment, and therefore no detailed description will be repeated.

Third Specific Example of the Linear Power Supply Shown in FIG. 31

Figure 34:
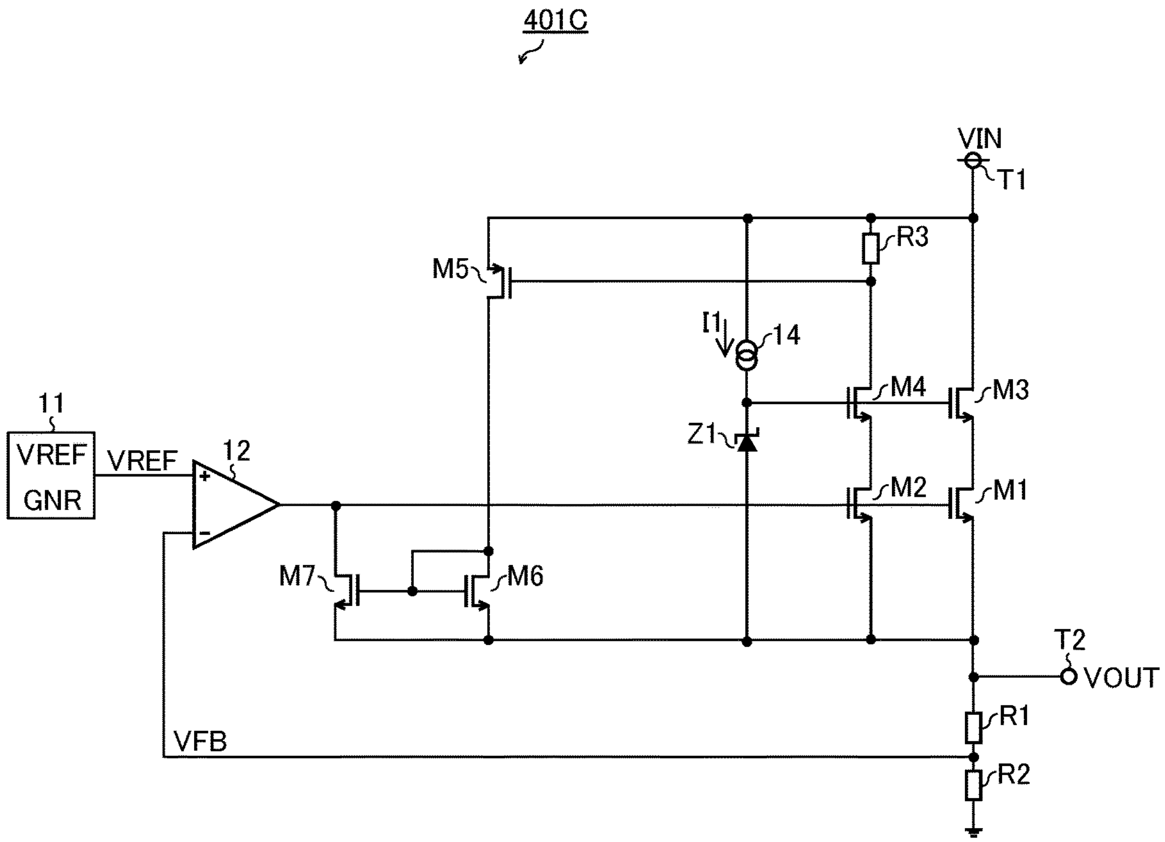
FIG. 34 is a diagram showing a third specific example of the linear power supply shown in FIG. 31.

FIG. 34 is a diagram showing a third specific example of the linear power supply shown in FIG. 31. The linear power supply 401C of the fourth embodiment shown in FIG. 34 has a configuration basically similar to that of the linear power supply 301C of the third embodiment, and therefore no detailed description will be repeated. The cathode of the Zener diode may be connected not to the output terminal T2 but to the ground potential.

<Application to a Vehicle>

Figure 35:
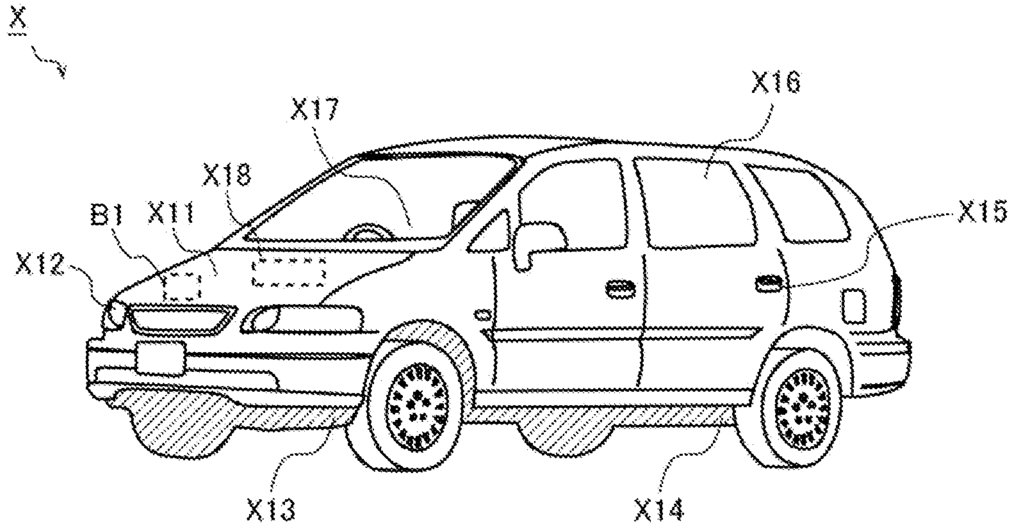
FIG. 35 is an exterior view of a vehicle.

FIG. 35 is an external view of a vehicle X. The vehicle X of this configuration example incorporates various electronic devices X11 to X18 that operate by being supplied with a supply voltage from a battery B1. For the sake of convenience, in the diagram, the electronic devices X11 to X18 may be shown at places different from where they are actually arranged.

The electronic device X11 is an engine control unit that performs control with respect to an engine (injection control, electronic throttle control, idling control, oxygen sensor heater control, automatic cruise control, etc.).

The electronic device X12 is a lamp control unit that controls the lighting and extinguishing of HIDs (high-intensity discharged lamps), DRLs (daytime running lamps), or the like.

The electronic device X13 is a transmission control unit that performs control with respect to a transmission.

The electronic device X14 is a movement control unit that performs control with respect to the movement of the vehicle X (ABS [anti-lock brake system] control, EPS [electric power steering] control, electronic suspension control, and the like).

The electronic device X15 is a security control unit that drives and controls door locks, burglar alarms, and the like.

The electronic device X16 comprises electronic devices incorporated in the vehicle X as standard or manufacturer-fitted equipment at the stage of factory shipment, such as wipers, power side mirrors, power windows, dampers (shock absorbers), a power sun roof, and power seats.

The electronic device X17 comprises electronic devices fitted to the vehicle X optionally as user-fitted equipment, such as A/V (audio/visual) equipment, a car navigation system, and an ETC (electronic toll control system).

The electronic device X18 comprises electronic devices provided with high-withstand-voltage motors, such as a vehicle-mounted blower, an oil pump, a water pump, and a battery cooling fan.

Any of the linear power supplies 100 to 105, 200 to 207, 300 to 302, and 400 to 401 described previously can be built into any of the electronic devices X11 to X18. The load of an electronic device that incorporates a linear power supply operates by being supplied with electric power from the linear power supply.

Notes

The present invention can be implemented with any configuration other than those of the embodiments described above, with any modifications made without departure from the spirit of the present invention. The embodiments described above are to be taken in every way illustrative and not restrictive, and the technical scope of the present invention is defined not by the description of the embodiments given above but by the appended claims and is to be understood to encompass any modifications made within a scope equivalent in significance to what is claimed.

Figure 36:
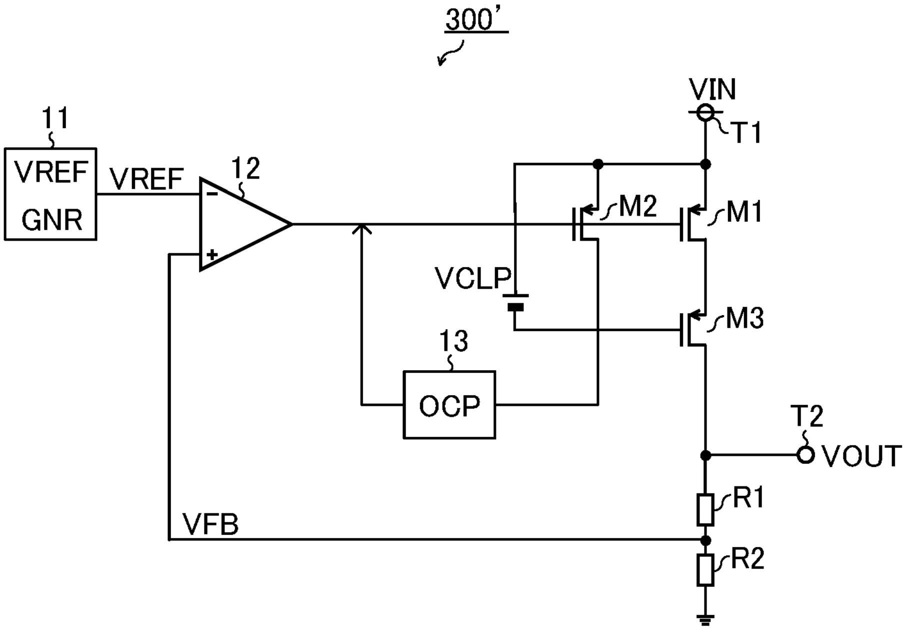
FIG. 36 is a diagram showing an outline of the configuration of a linear power supply of a modified example.

For example, from the linear power supply 300 of the third embodiment, the fourth transistor M4 can be omitted to configure a linear power supply 300' as in a modified example shown in FIG. 36. A similar modification is possible with the linear power supply 400 of the fourth embodiment.

According to one aspect of what is disclosed herein, a linear power supply (100-105, 200-207) includes: a first transistor (M1) configured to be connectable between an input terminal (T1) configured to input an input voltage (VIN) thereto and an output terminal (T2) configured to output an output voltage (VOUT) therefrom; a reference voltage generator (1) configured to generate a reference voltage (VREF); a controller (2, 3, M3, M4, R3, R4) configured to control the first transistor based on the difference between a feedback voltage (VFB) reflecting the output voltage and the reference voltage; and a second transistor (M2) configured to be connectable between the input terminal or the output terminal and the first transistor and configured to clamp the first terminal-to-second terminal voltage of the first transistor. (A first configuration.)

In the linear power supply of the first configuration described above, the second transistor clamps the first terminal-to-second terminal voltage of the first transistor. It is thus possible to suppress, in the event of a large variation in the input voltage, a variation in the characteristics of the power supply, and this makes it easy to sustain the stability of the power supply.

In the linear power supply of the first configuration described above, the first transistor may have a lower withstand voltage than the second transistor. (A second configuration.)

With the linear power supply of the second configuration described above, it is possible to reduce the size and cost of the first transistor.

In the linear power supply of the first or second configuration described above, the first and second transistors may each be a PMOSFET or a PNP bipolar transistor, and the second transistor may be configured to be connectable between the first transistor and the output terminal. (A third configuration.)

The linear power supply of the third configuration described above may further include a control voltage feeder (3, M3, M4, R3, R4, Z1) configured to feed the control terminal of the second transistor with a control voltage that is a voltage lower than the input voltage by a predetermined value. (A fourth configuration.)

With the linear power supply of the fourth configuration described above, it is possible to allow the second transistor to clamp the first terminal-to-second terminal voltage of the first transistor with a simple configuration.

In the linear power supply of the first or second configuration described above, the first and second transistors may each be a NMOSFET or a NPN bipolar transistor, and the second transistor may be configured to be connectable between the input terminal and the first transistor. (A fifth configuration.)

The linear power supply of the fifth configuration described above may further include a control voltage feeder configured to feed the control terminal of the second transistor with a control voltage that is a voltage higher than the output voltage by a predetermined value or a constant voltage. (A sixth configuration.)

With the linear power supply of the sixth configuration described above, it is possible to allow the second transistor to clamp the first terminal-to-second terminal voltage of the first transistor with a simple configuration.

In the linear power supply of the fourth or sixth configuration described above, the controller may include an amplifier, and the control voltage feeder may include a Zener diode and a current source connected in series with the Zener diode. (A seventh configuration.)

With the linear power supply of the seventh configuration described above, the control voltage feeder is not included in the controller, and this makes it easy for the controller to control the first transistor.

According to what is disclosed herein, an electronic device (X11-X18) can include the linear power supply of any of the first to seventh configurations described above. (An eighth configuration.)

With the electronic device of the eighth configuration described above, it is easy to sustain the stability of the linear power supply.

According to what is disclosed herein, a vehicle (X) can include: the electronic device of the eighth configuration described above; and a battery (B1) for supplying the electronic device with electric power. (A ninth configuration.)

With the vehicle of the ninth configuration described above, it is easy to sustain the stability of the linear power supply.

According to another aspect of what is disclosed herein, a linear power supply (300, 300', 301, 301A-301C, 302, 400, 401, 401A-401C) includes: a first transistor (M1) configured to be connectable between an input terminal (T1) configured to input an input voltage (VIN) thereto and an output terminal (T2) configured to output an output voltage (VOUT) therefrom; a reference voltage generator (11) configured to generate a reference voltage (VREF); a controller (12, 14, M8, M9, R4, R5) configured to control the first transistor based on the difference between a feedback voltage (VFB) reflecting the output voltage and the reference voltage; a second transistor (M2) configured to be paired with the first transistor to be included in a current mirror circuit; a third transistor (M3) configured to be connectable between the input terminal or the output terminal and the first transistor and configured to clamp the first terminal-to-second terminal voltage of the first transistor; and an overcurrent protection circuit (13) configured to protect a load from an overcurrent based on a mirrored current output from the second transistor. (A tenth configuration.)

In the linear power supply of the tenth configuration described above, the third transistor clamps the first terminal-to-second terminal voltage of the first transistor. It is thus possible to suppress, in the event of a large variation in the input voltage, a variation in the characteristics of the power supply, and this makes it easy to sustain the stability of the power supply. Moreover, a low-withstand-voltage transistor can be used as the first transistor. This helps enhance the accuracy of the size ratio between the first and second transistors and enhance the accuracy of overcurrent protection.

The linear power supply of the tenth configuration described above may further include a fourth transistor configured to be connected in series with the second transistor and configured to clamp the first terminal-to-second terminal voltage of the second transistor at a value equal to the first terminal-to-second terminal voltage of the first transistor. (An eleventh configuration.)

In the linear power supply of the eleventh configuration described above, the first terminal-to-second terminal voltage of the second transistor has a value equal to the first terminal-to-second terminal voltage of the first transistor. This helps further enhance the accuracy of the mirrored current and further enhance the accuracy of overcurrent protection.

In the linear power supply of the tenth or eleventh configuration described above, the first and second transistors may have a withstand voltage lower than the third transistor. (A twelfth configuration.)

With the linear power supply of the twelfth configuration described above, it is possible to reduce the size and cost of the first and second transistors.

In the linear power supply of any of the tenth to twelfth configurations described above, the first, second, and third transistor may each be a PMOSFET or a PNP bipolar transistor, and the third transistor may configured to be connectable between the first transistor and the output terminal. (A thirteenth configuration.)

The linear power supply of the thirteenth configuration described above may further include a control voltage feeder (14, M8, M9, R4, R5, Z1) configured to feed the control terminal of the third transistor with a control voltage that is a voltage lower than the input voltage by a predetermined value. (A fourteenth configuration.)

With the linear power supply of the fourteenth configuration described above, it is possible to allow the third transistor to clamp the first terminal-to-second terminal voltage of the first transistor with a simple configuration.

In the linear power supply of any of the tenth to twelfth configurations described above, the first, second, and third transistor may each be an NMOSFET or an NPN bipolar transistor, and the third transistor may be configured to be connectable between the input terminal and the first transistor. (A fifteenth configuration.)

The linear power supply of the fifteenth configuration described above may further include a control voltage feeder configured to feed the control terminal of the third transistor with a control voltage that is a voltage higher than the output voltage by a predetermined value or a constant voltage. (A sixteenth configuration.)

With the linear power supply of the sixteenth configuration described above, it is possible to allow the third transistor to clamp the first terminal-to-second terminal voltage of the first transistor with a simple configuration.

In the linear power supply of the fourteenth or sixteenth configuration described above, the control voltage feeder may include a Zener diode (Z1) and a current source (4) connected in series with the Zener diode. (A seventeenth configuration.)

With the linear power supply of the seventeenth configuration described above, the control voltage feeder is not included in the controller, and this makes it easy for the controller to control the first transistor.

According to what is disclosed herein, an electronic device (X11-X18) can include the linear power supply of any of the tenth to seventeenth configurations described above. (An eighteenth configuration.)

With the electronic device of the eighteenth configuration described above, it is easy to sustain the stability of the linear power supply. Moreover, with the electronic device of the eighteenth configuration described above, overcurrent protection has enhanced accuracy.

According to what is disclosed herein, a vehicle (X) can include: the electronic device of the eighteenth configuration described above; and a battery (B1) for supplying the electronic device with electric power. (A nineteenth configuration.)

With the vehicle of the nineteenth configuration described above, it is easy to sustain the stability of the linear power supply. Moreover, with the vehicle of the nineteenth configuration described above, overcurrent protection has enhanced accuracy.

The invention claimed is:

1. A linear power supply, comprising:
- a first transistor configured to be connectable between an input terminal configured to input an input voltage thereto and an output terminal configured to output an output voltage therefrom;
- a reference voltage generator configured to generate a reference voltage;
- a controller configured to control the first transistor based on a difference between a feedback voltage reflecting the output voltage and the reference voltage; and
- a second transistor configured to be connectable between the input terminal or the output terminal and the first transistor and configured to clamp a voltage between a first terminal and a second terminal of the first transistor at a target value, which is substantially constant, within a range in which the input voltage is higher than a value calculated by adding the target value to the output voltage.

2. The linear power supply according to claim 1, wherein the first transistor has a lower withstand voltage than the second transistor.

3. The linear power supply according to claim 1, wherein the first and second transistors are each a PMOSFET or a PNP bipolar transistor, and
the second transistor is configured to be connectable between the first transistor and the output terminal.

4. The linear power supply according to claim 3, further comprising a control voltage feeder configured to feed a control terminal of the second transistor with a control voltage that is a voltage lower than the input voltage by a predetermined value.

5. The linear power supply according to claim 1, wherein the first and second transistors are each a NMOSFET or a NPN bipolar transistor, and
the second transistor is configured to be connectable between the input terminal and the first transistor.

6. The linear power supply according to claim 5, further comprising a control voltage feeder configured to feed a control terminal of the second transistor with a control voltage that is a voltage higher than the output voltage by a predetermined value or a constant voltage.

7. A linear power supply, comprising:
- a first transistor configured to be connectable between an input terminal configured to input an input voltage thereto and an output terminal configured to output an output voltage therefrom;
- a reference voltage generator configured to generate a reference voltage;
- a controller configured to control the first transistor based on a difference between a feedback voltage reflecting the output voltage and the reference voltage;
- a second transistor configured to be paired with the first transistor to be included in a current mirror circuit;
- a third transistor configured to be connectable between the input terminal or the output terminal and the first transistor and configured to clamp a voltage between a first terminal and a second terminal of the first transistor at a target value, which is substantially constant, within a range in which the input voltage is higher than a value calculated by adding the target value to the output voltage; and an overcurrent protection circuit configured to protect a load from an overcurrent based on a mirrored current output from the second transistor.

8. The linear power supply according to claim 7, further comprising a fourth transistor configured to be connected in series with the second transistor and configured to clamp a first terminal-to-second terminal voltage of the second transistor at a value equal to the first terminal-to-second terminal voltage of the first transistor.

9. The linear power supply according to claim 7, wherein the first and second transistors have a withstand voltage lower than the third transistor.

10. The linear power supply according to claim 7, wherein the first, second, and third transistor are each a PMOSFET or a PNP bipolar transistor, and the third transistor is configured to be connectable between the first transistor and the output terminal.

11. The linear power supply according to claim 10, further comprising a control voltage feeder configured to feed a control terminal of the third transistor with a control voltage that is a voltage lower than the input voltage by a predetermined value.

12. The linear power supply according to claim 7, wherein the first, second, and third transistor are each an NMOSFET or an NPN bipolar transistor, and the third transistor is configured to be connectable between the input terminal and the first transistor.

13. The linear power supply according to claim 12, further comprising a control voltage feeder configured to feed a control terminal of the third transistor with a control voltage that is a voltage higher than the output voltage by a predetermined value or a constant voltage.

14. The linear power supply according to claim 4, wherein the controller includes an amplifier, and the control voltage feeder includes a Zener diode and a current source connected in series with the Zener diode.

15. The linear power supply according to claim 6, wherein the controller includes an amplifier, and the control voltage feeder includes a Zener diode and a current source connected in series with the Zener diode.

16. The linear power supply according to claim 11, wherein the controller includes an amplifier, and the control voltage feeder includes a Zener diode and a current source connected in series with the Zener diode.

17. An electronic device, comprising the linear power supply according to claim 1.

18. An electronic device, comprising the linear power supply according to claim 7.

19. A vehicle, comprising:

the electronic device according to claim 17; and a battery for supplying the electronic device with electric power.

20. A vehicle, comprising:

the electronic device according to claim 18; and a battery for supplying the electronic device with electric power.

* * * * *